(12) United States Patent
Fitch et al.

(10) Patent No.: US 9,578,454 B1
(45) Date of Patent: Feb. 21, 2017

(54) NAVIGATION SYSTEM WITH FEED PRIORITIZATION MECHANISM AND METHOD OF OPERATION THEREOF

(71) Applicant: Telenav, Inc., Sunnyvale, CA (US)

(72) Inventors: Britt Fitch, Medford, MA (US); Jonathan Nguyen, Somerville, MA (US); Matthew James Hanselman, Arlington, MA (US); Aliasgar Mumtaz Husain, Milpitas, CA (US); Michael Banos, Melrose, MA (US); Anna Maria Ayuso Holschuh, Cambridge, MA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/627,714

(22) Filed: Feb. 20, 2015

(51) Int. Cl.
*H04W 4/02* (2009.01)
*H04W 4/06* (2009.01)
*H04W 72/04* (2009.01)
*H04W 72/10* (2009.01)

(52) U.S. Cl.
CPC ............ *H04W 4/021* (2013.01); *H04W 4/06* (2013.01); *H04W 72/0453* (2013.01); *H04W 72/10* (2013.01)

(58) Field of Classification Search
CPC ............ G06F 3/0482; G06F 17/30867; G06F 17/30274; G06F 17/30554; G06F 17/30884; G06F 11/1438; G06F 17/24; G06F 3/04842; G06F 3/04847; G06F 3/04883; G06F 17/30241; G06F 17/3087; G06F 17/30923
USPC ...................................... 455/456.3
See application file for complete search history.

(56) References Cited

U.S. PATENT DOCUMENTS

| 7,188,085 | B2 | 3/2007 | Pelletier |
| 8,645,055 | B2 | 2/2014 | Chen et al. |
| 2008/0209339 | A1* | 8/2008 | Macadaan ............. G06F 3/0482 715/745 |

* cited by examiner

*Primary Examiner* — Kwasi Karikari
(74) *Attorney, Agent, or Firm* — IP Investment Law Group

(57) ABSTRACT

A navigation system includes: a control unit configured to generate a feed hierarchy for prioritizing a trustworthiness of an interest feed based on a feed characteristic; determine a discrepancy by comparing the interest feed with the interest list, a feed record, or a combination thereof; determine a feed authorization based on the feed characteristic, the feed hierarchy, an entry category, or a combination thereof for manipulating the interest list; generate an update to the interest list based on the discrepancy, the feed hierarchy, and the feed authorization; and confirm the update to the interest list based on a navigation behavior at an interest location associated with the update as determined by a location unit coupled to the control unit.

20 Claims, 8 Drawing Sheets

| FEED NAME / ID | FEED TYPE | FEED SRC | FEED COST | FREQ / TIME | FEED AUTH | FEED ER% | FEED ENTRIES | DELTA (Δ) ENTRIES |
|---|---|---|---|---|---|---|---|---|
| Starbucks store (SBX_store) | RSS | BRND | FREE | 1/MON OCT 2 | ADD | 0 | {POI_124, POI_248...POI_465, POI_904...} | +POI_904 -POI_323 -POI_465 |
| Starbucks calendar (SBX_cldr) | RSS | BRND | FREE | 2/MON OCT 2 | ADD REM CONTR | 0 | {EV_141, EV_358, EV_871...} | +EV_97... -EV_122... |
| AT&T interactive Paid (ATTi_paid) | ATOM | GC | PAID | 1/WK OCT 2 | ADD REM CONTR | 5 | {POI_1, POI_2... POI_124, POI_248... POI_465, POI_904...} | +POI_45 -POI_323 -POI_465 |
| ATTi Free (ATTi_free) | ATOM | GC | FREE | 1/MON OCT 2 | ADD CONTR | 15 | {POI_1, POI_2... POI_124...P OI_248... POI_904...} | +POI_904 -POI_45 -POI_323 |
| Citysearch POI (CS_POI) | ATOM | GC | FREE | 2/MON OCT 2 | ADD CONTR | 9 | {POI_1, POI_2... POI_124... POI_248... POI_904...} | +POI_904 -POI_45 -POI_323 -POI_465 |
| yp.com local (YP) | ATOM | GC | FREE | 2/MON OCT 2 | CONTR | 10 | {POI_124 ADDRESS, POI_125...} | NONE |
| Local events (LE) | TUF | USR | FREE | 1/WK OCT 2 | ADD CONTR | 12 | {EV_140, EV_141, EV_142 (in 2 wks)...} | NONE |
| POI web crawl feed (POI_crwl) | CRWL | USR | FREE | 2/WK OCT 2 | CONTR | 24 | {POI_1, POI_2... POI_124, POI_248... POI_465...} | +POI_904 -POI_45 -POI_323 -POI_465 |

TRUST LEVEL:
1. STBX STORE FEED (99)
2. STBX CALENDAR FEED (94)
3. ATTi PAID FEED (89)
   ATTi FREE FEED
   CITYSEARCH POI FEED
   LOCAL EVENTS FEED
   YP.COM LOCAL FEED
   POI WEB CRAWL FEED

{PRI. RULES: SRC > COST > TYPE <=> ERR %...}

FIG. 2

NAVIGATION SYSTEM WITH FEED PRIORITIZATION MECHANISM AND METHOD OF OPERATION THEREOF

TECHNICAL FIELD

The present invention relates generally to a navigation system, and more particularly to a system with a feed prioritization mechanism.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to provide information concerning points of interest (POIs) along with navigation information.

However, the high rate of turnover among today's businesses often present challenges with respect to information gathering concerning such businesses. Thus, a need still remains for a navigation system with a feed prioritization mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including a control unit configured to generate a feed hierarchy for prioritizing a trustworthiness of an interest feed based on a feed characteristic; determine a discrepancy by comparing the interest feed with an interest list, a feed record, or a combination thereof; determine a feed authorization based on the feed characteristic, the feed hierarchy, an entry category, or a combination thereof for manipulating the interest list; generate an update to the interest list based on the discrepancy, the feed hierarchy, and the feed authorization; confirm the update to the interest list based on a navigation behavior at an interest location associated with the update as determined by a location unit coupled to the control unit; and a communication interface, coupled to the control unit, and configured to communicate the update.

An embodiment of the present invention provides a method of operation of a navigation system including generating, with a control unit, a feed hierarchy for prioritizing a trustworthiness of an interest feed based on a feed characteristic; determining a discrepancy by comparing the interest feed with an interest list, a feed record, or a combination thereof; determining a feed authorization based on the feed characteristic, the feed hierarchy, an entry category, or a combination thereof for manipulating the interest list; generating an update to the interest list based on the discrepancy, the feed hierarchy, and the feed authorization; confirming the update to the interest list based on a navigation behavior at an interest location associated with the update as determined by a location unit coupled to the control unit; and communicating the update, with a communication interface coupled to the control unit.

An embodiment of the present invention provides a non-transitory computer readable medium including generating a feed hierarchy for prioritizing a trustworthiness of an interest feed based on a feed characteristic; determining a discrepancy by comparing the interest feed with an interest list, a feed record, or a combination thereof; determining a feed authorization based on the feed characteristic, the feed hierarchy, an entry category, or a combination thereof for manipulating the interest list; generating an update to the interest list based on the discrepancy, the feed hierarchy, and the feed authorization; confirming the update to the interest list based on a navigation behavior at an interest location associated with the update; and communicating the update.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 2 is an example of a display on a display interface of the navigation system.

DETAILED DESCRIPTION

Figure 1:
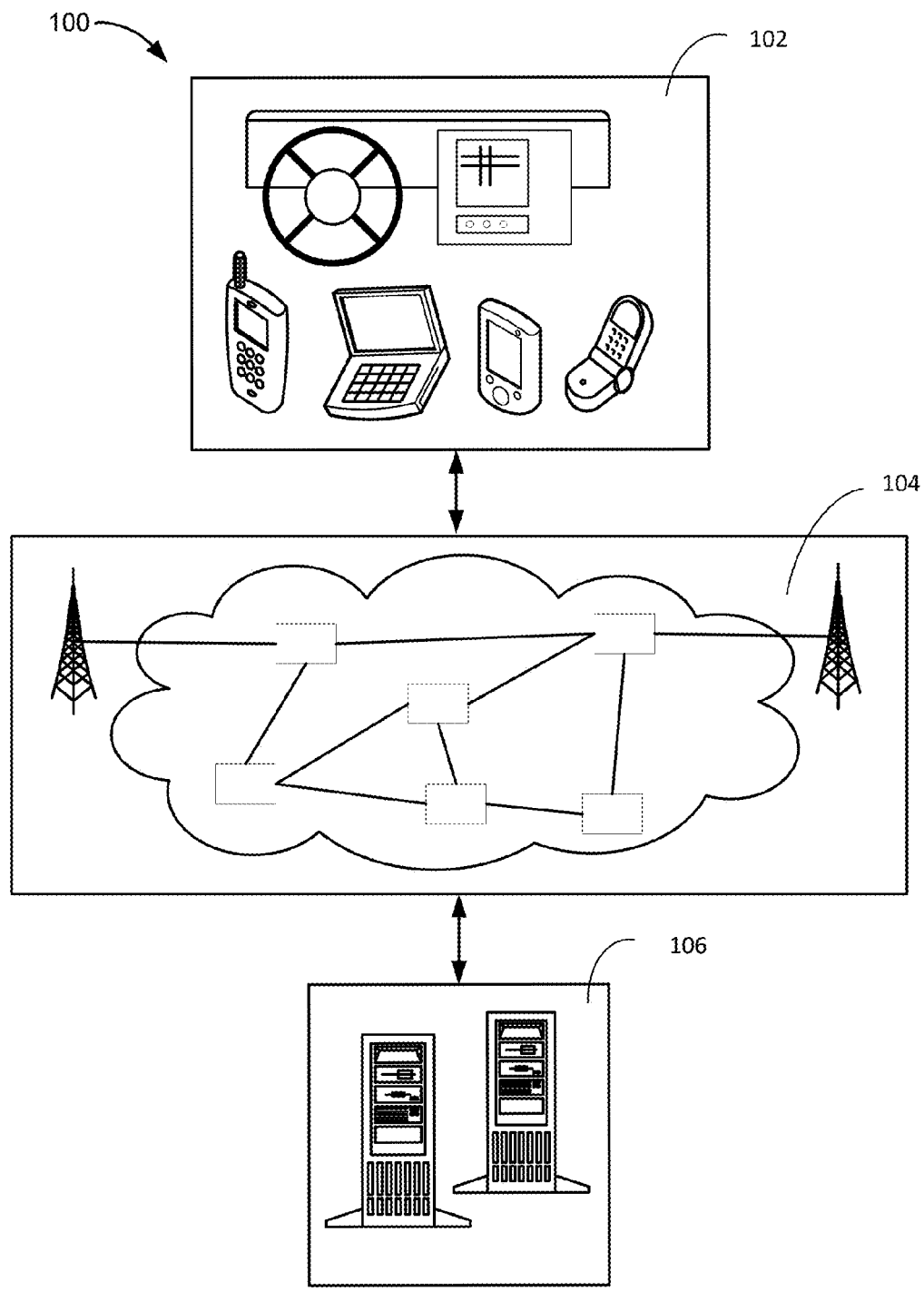
FIG. 1 is a navigation system with a feed prioritization mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims sections below, the modules are deemed to include hardware circuitry for the purposes and the scope of the apparatus claims.

Referring now to FIG. 1, therein is shown a navigation system 100 with a feed prioritization mechanism in an embodiment of the present invention. The navigation system 100 includes a first device 102, such as a client or a server, connected to a second device 106, such as a client or a server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or a device incorporated with a vehicle, for example a car, a truck, a bus, a ship or a boat, a plane, a train, or a combination thereof. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Referring now to FIG. 2, therein is shown an example of a display on a display interface 202 of the navigation system 100. As an example, the display interface 202 can be the display interface of the first device 102 of FIG. 1, the second device 106 of FIG. 1, or a combination thereof. The display interface 202 can depict a feed record 210 of multiple instances of an interest feed 204 including a first feed 206 and a second feed 208.

The interest feed 204 is a source of bulk data or information concerning point of interests (POIs) or events. The interest feed 204 can be syndicated by a publisher or retrieved from a database. As an example, the interest feed 204 can be a web feed, an extensible markup language (XML) feed such as a rich site summary (RSS) feed or an Atom feed, a common-separated values (CSV) feed, a resource description framework (RDF) feed, or a combination thereof.

The first feed 206 is one instance of the interest feed 204 and the second feed 208 can be another instance of the interest feed 204. In addition, the second feed 208 can be an instance of the first feed 206 collected at a later time. As an example, the first feed 206 can be the AT&T Interactive™ (ATTi™) business feed. In this example, the second feed 208 can be the Citysearch™ POI feed. As an additional example, the second feed 208 can be the ATTi™ business feed collected at a subsequent time, such as one month after the first feed 206 is collected.

The feed record 210 is an electronic directory of multiple instances of the interest feed 204 aggregated by the navigation system 100. As seen in FIG. 2, the feed record 210 can include a feed name 212, a feed characteristic 214, a collection time 232, a feed frequency 234, or a combination thereof.

The feed characteristic 214 is an attribute of the interest feed 204 used by the navigation system 100 to organize multiple instances of the interest feed 204. The feed characteristic 214 can include a feed source 216, a feed cost 224, a feed type 230, or a combination thereof. The feed source 216 is an originator of information included in the interest feed 204. As an example, the feed source 216 can include a brand-specific feed 218, a general commercial feed 220, a user-generated feed 222, or a combination thereof.

The brand-specific feed 218 is an instance of the interest feed 204 originating from a corporate entity responsible for collecting location or event information concerning the corporate entity's locations or events. As an example, the brand-specific feed 218 can include a Starbucks™ store location feed including address and service information concerning Starbucks™ retail locations worldwide.

The general commercial feed 220 is an instance of the interest feed 204 originating from a business or location directory service. As an example, the general commercial feed 220 can include the ATTi™ business feed, the Citysearch™ POI feed, or a combination thereof.

The user-generated feed 222 is an instance of the interest feed 204 originating from one or more user-driven sources, such as a crowd source. As an example, the user-generated feed 222 can include an OpenStreetMap™ feed. As an additional example, the user-generated feed 222 can include an event or activity feed from a user-generated review platform.

The feed cost 224 is an amount paid by the navigation system 100 for obtaining the interest feed 204. As an example, the interest feed 204 can either be a paid feed 226 or a free feed 228. The paid feed 226 is an instance of the interest feed 204 obtained by the navigation system 100 for a fee. As an example, the paid feed 226 can include the ATTi™ paid feed. The free feed 228 is an instance of the interest feed 204 obtained by the navigation system 100 without a fee. As an additional example, the free feed 228 can include the user-generated feed 222.

The feed type 230 is a file type or transmission protocol associated with the interest feed 204. The feed type 230 can include information received from an XML feed such as an RSS feed, an Atom feed, a web crawl, a Transaction Update File (TUF), a CSV file, or a combination thereof.

The collection time 232 is a time recorded by the navigation system 100 when the interest feed 204 is first received or retrieved by the navigation system 100. The feed frequency 234 is a rate at which the interest feed 204 is received or retrieved by the navigation system 100. As an example, the general commercial feed 220 can be received by the navigation system 100 once per month, once per week, or a combination thereof.

Each of the interest feed 204 can include a number of feed entries 236. The feed entries 236 are items of information pertaining to a particular location or event included in the interest feed 204. As an example, one of the feed entries 236 can include address information and hours of operation concerning a POI such as a restaurant, a residence, or a travel destination. As an additional example, another of the feed entries 236 can include time or date information concerning an event such as a sporting event, a musical event, or a social event.

Each of the feed entries 236 can have a feed identifier 238, an entry identifier 240, or a combination thereof. The feed identifier 238 is a label or tag signifying the interest feed 204 from which the feed entries 236 originate. As an example, the feed identifier 238 can be created based on the feed name 212, the feed characteristic 214, the collection time 232, or a combination thereof. As a more specific example, the feed identifier 238 of "sbux_TUF_loc_102014" can signify this entry originated from a Starbucks™ TUF file received by the navigation system on Oct. 20, 2014.

The entry identifier 240 is a label or tag signifying one or more attributes of the feed entries 236. The entry identifier 240 can be generated using an entry category 242, an entry content 250, or a combination thereof. The entry category 242 is a classification of the feed entries 236 based on a type of information provided by the feed entries 236. The entry category 242 can include a location entry 244 and an event entry 246.

The location entry 244 is an instance of the feed entries 236 concerning a physical location. As an example, the entry category 242 of the location entry 244 can encompass the feed entries 236 for a restaurant, a gas station, a hotel, or a landmark. The event entry 246 is an instance of the feed entries 236 concerning an activity or event. As an example, the entry category 242 of the event entry 246 can encompass the feed entries 236 for a musical event, sporting event, or a social event.

The entry content 250 is the type of information included as part of the feed entries 236. As an example, the entry content 250 can include an address information, operating hours, a phone number, a website address, user-generated reviews, or a combination thereof. In addition, the entry content 250 can include a timing 248 of the event entry 246 such as a start time, an end time, or a combination thereof.

The display interface 202 can also depict a feed hierarchy 252. The feed hierarchy 252 is a classification of multiple instances of the interest feed 204 in a tiered or graded structure according to set rules or regulations. The navigation system 100 can generate the feed hierarchy 252 based on priority rules 258. The priority rules 258 are constraints for prioritizing a trustworthiness 254 of multiple instances of the interest feed 204.

The trustworthiness 254 of the interest feed 204 refers to the credibility and accuracy of the interest feed 204. As will be discussed in more detail below, the trustworthiness 254 of the interest feed 204 can be determined based on an amount of erroneous or inaccurate information included in the interest feed 204. The navigation system 100 can determine the trustworthiness 254 of the interest feed 204 based on a feed error rate 262.

The feed error rate 262 is the number of times the interest feed 204 provided erroneous information out of the total number of times the interest feed 204 was received or retrieved by the navigation system 100. The feed error rate 262 can be expressed as a percentage or a ratio.

The navigation system 100 can generate the feed hierarchy 252 by assigning the interest feed 204 with a hierarchy position 256, a trust score 260, or a combination thereof. The hierarchy position 256 is a place on the feed hierarchy 252 occupied by the interest feed 204. The trust score 260 is a numerical value representing the trustworthiness 254 of the interest feed 204. As will be discussed in more detail below, the navigation system 100 can determine the hierarchy position 256, the trust score 260, or a combination thereof based on the feed characteristic 214, the feed frequency 234, or a combination thereof.

The display interface 202 can also depict a feed authorization 264. The feed authorization 264 is permission granted by the navigation system 100 allowing the interest feed 204 to make changes to a directory or listing of the navigation system 100. The feed authorization 264 can include a first authorization 266 and a second authorization 268. As an example, the first authorization 266 can be the feed authorization 264 of the first feed 206. As an additional example, the second authorization 268 can be the feed authorization 264 of the second feed 208. The feed authorization 264 can include an addition authority 270, a removal authority 272, a contribution authority 274, or a combination thereof.

The addition authority 270 is permission allowing the interest feed 204 to add information to the directory or listing of the navigation system 100. The removal authority 272 is permission allowing the interest feed 204 to delete information from the directory or listing of the navigation system 100. The addition authority 270 can allow an instance of the interest feed 204 to add a new entry 276 to the directory or listing of the navigation system 100.

The new entry 276 is an instance of the feed entries 236 not included in the current records of the navigation system 100. As an example, the new entry 276 can be information concerning a newly opened café, a new theatrical event, or a combination thereof. Adding the new entry 276 to the records of the navigation system 100 will be discussed in detail below.

The removal authority 272 can allow an instance of the interest feed 204 to remove an entry from the records of the navigation system 100 based on a missing entry 278. The missing entry 278 is an entry from the feed record 210 not included in the feed entries 236 of the interest feed 204. As an example, the missing entry 278 can be a recently closed business, a canceled music concert, or a combination thereof. The navigation system 100 can delete information from the records or lists of the navigation system 100 corresponding to the missing entry 278.

The contribution authority 274 is permission allowing the interest feed 204 to contribute information to the directory or listing of the navigation system 100. As an example, the interest feed 204 can contribute metadata or ancillary information such as user-generated rankings or reviews pertaining to the location entry 244, the event entry 246, or a combination thereof.

The interest feed 204 can also include a former entry 280. The former entry 280 is an instance of the feed entries 236 included in a current instance of the interest feed 204 and corresponding to a deleted or past entry in the records of the navigation system 100. As an example, the former entry 280 can be a POI entry previously recently deleted from the records of the navigation system 100. As an additional example, the former entry 280 can be a concert listing in the process of being deleted from the records of the navigation system 100. The former entry 280 will be discussed in more detail below.

Figure 3:
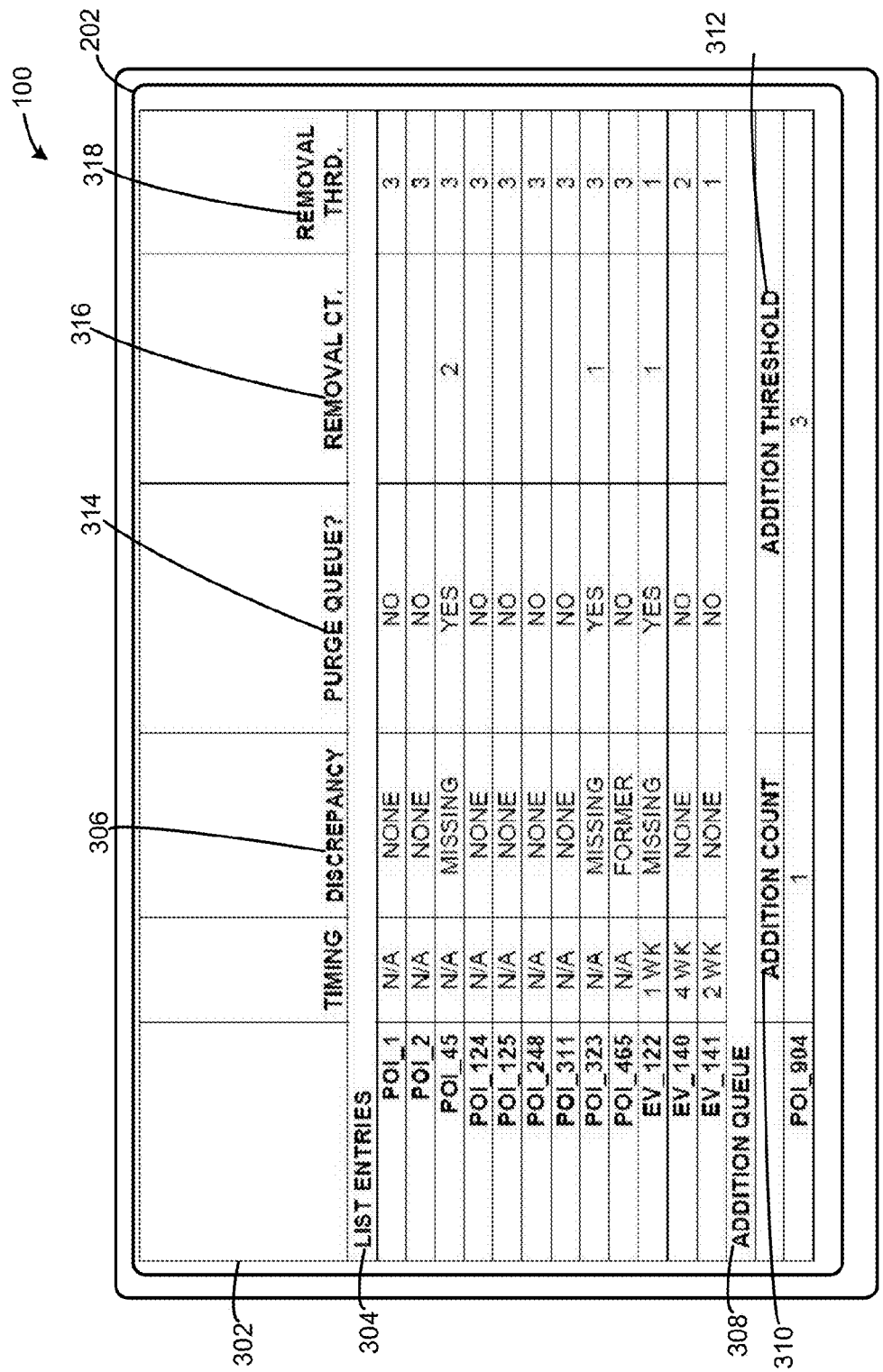
FIG. 3 is an example of another display on the display interface of the navigation system.

Referring now to FIG. 3, therein is shown an example of another display on the display interface 202 of the navigation system 100. The display interface 202 can include the first device 102 of FIG. 1, the second device 106 of FIG. 1, or a combination thereof. The display interface 202 can depict an interest list 302.

The interest list 302 is an electronic directory or listing of location or event information. As an example, the interest list 302 can be a POI listing, an event listing, or a combination thereof. As will be discussed in more detail below, the navigation system 100 can generate the interest list 302 based on contributions from multiple instances of the interest feed 204 of FIG. 2.

The interest list 302 can include a number of list entries 304. The list entries 304 are items of information pertaining to a particular location or event stored as part of the interest list 302. The feed entries 236 of FIG. 2 can be the list entries 304 when the feed entries 236 are added to the interest list 302.

The navigation system 100 can make changes to the interest list 302 when a discrepancy 306 is found between the interest feed 204 and the feed record 210 of FIG. 2 or between the interest feed 204 and the interest list 302. The discrepancy 306 is a deviation between information provided by the interest feed 204 and information contained in the feed record 210, the interest list 302, or a combination thereof.

The discrepancy 306 can include the new entry 276 of FIG. 2, the missing entry 278 of FIG. 2, or the former entry 280 of FIG. 2. The navigation system 100 can add either the new entry 276 or the former to the interest list 302 by adding the new entry 276 or the former entry 280 to an addition queue 308. The addition queue 308 is a waiting list for transitioning the feed entries 236 onto the interest list 302. The navigation system 100 can add either the new entry 276 or the former entry 280 to the interest list 302 from the addition queue 308 when an addition count 310 exceeds an addition threshold 312.

The addition count 310 is a record of the number of times the new entry 276 is included in the interest feed 204 aggregated by the navigation system 100. The addition threshold 312 is a minimum number of counts which must be exceeded before an entry can be added to the interest list 302. As an example, the addition threshold 312 can be three counts and the navigation system 100 can add the new entry 276 to the interest list 302 when the addition count 310 of the new entry 276 exceeds three counts.

The navigation system 100 can also add one of the list entries 304 corresponding to the missing entry 278 to a purge queue 314. The purge queue 314 is a waiting list for transitioning the list entries 304 off the interest list 302. The navigation system 100 can remove one of the list entries 304 corresponding to the missing entry 278 from the interest list 302 by removing the list entries 304 from the purge queue 314. The navigation system 100 can remove the list entries 304 from the purge queue 314 when a removal count 316 exceeds a removal threshold 318.

The removal count 316 is a record of the number of times the missing entry 278 is included in the interest feed 204 aggregated by the navigation system 100. The removal threshold 318 is a minimum number of counts which must be exceeded before one of the list entries 304 can be removed from the interest list 302. As an example, the removal threshold 318 can be three counts and the navigation system 100 can remove one of the list entries 304 corresponding to the missing entry 278 when the removal count 316 of the list entries 304 exceeds three counts.

Figure 4:
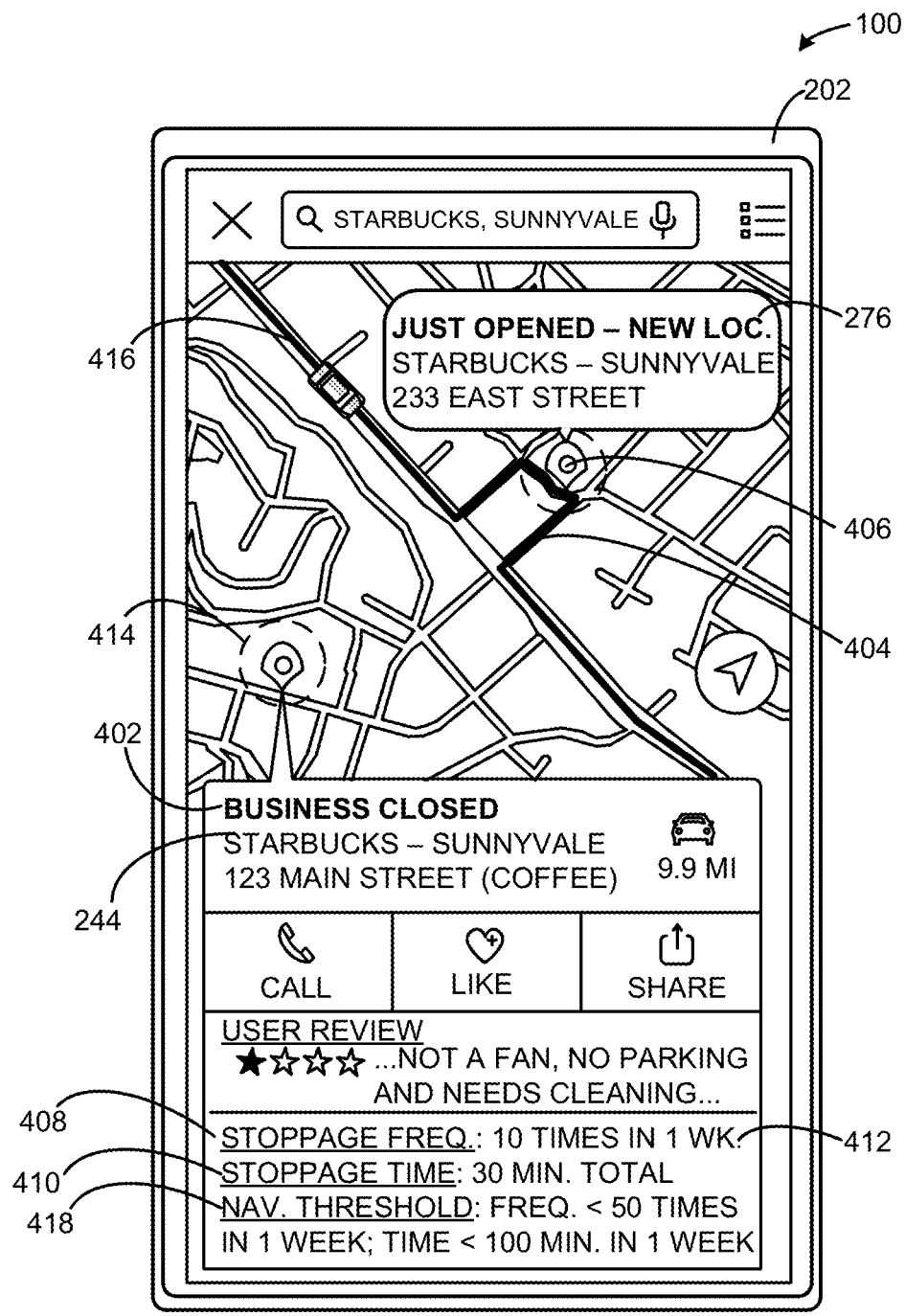
FIG. 4 is an example of a display on the display interface of the first device.

Referring now to FIG. 4, therein is shown an example display on the display interface 202 of the first device 102 of FIG. 1. The display interface 202 can depict multiple instances of an update 402 to the interest list 302 of FIG. 3 as shown to a user of the first device 102. The update 402 can include removing one of the list entries 304 of FIG. 3 from the interest list 302 or adding the new entry 276 to the interest list 302.

As an example, FIG. 4 depicts the update 402 as a removal of an instance of the location entry 244 from the interest list 302. As shown in FIG. 4, the location entry 244 can be a recently closed Starbucks™ café location. In this example, the recently closed Starbucks™ café location can correspond to the missing entry 278 of FIG. 2. Also, in this example, the missing entry 278 can be included in an instance of the interest feed 204 of FIG. 2 with the removal authority 272 of FIG. 2 such as the brand-specific feed 218 of FIG. 2 of Starbucks™ store locations.

Continuing with this example, the navigation system 100 can remove the recently closed Starbucks™ café location from the interest list 302 by adding the location entry 244 to the purge queue 314 of FIG. 3 when the brand-specific feed 218 omits the location entry 244 from its own instance of the feed entries 236 of FIG. 2. The navigation system 100 can then remove the recently closed Starbucks™ from the interest list 302 when the removal count 316 of FIG. 3 associated with the recently closed Starbucks™ café location exceeds the removal threshold 318 of FIG. 3. The purge queue 314, the removal count 316, and the removal threshold 318 can be utilized by the navigation system 100 to prevent any of the list entries 304 from being deleted or removed by mistake.

As an additional example, FIG. 4 also depicts the new entry 276 added to the interest list 302. As shown in FIG. 4, the new entry 276 can be a recently opened Starbucks™ café location. The new entry 276 can be included in an instance of the interest feed 204 with the addition authority 270 of FIG. 2 such as the brand-specific feed 218 of Starbucks™ store locations.

The display interface 202 can also depict an interest location 406 associated with the update 402. The interest location 406 is a geographic location or coordinate of the location entry 244 or the event entry 246 of FIG. 2 associated with the update 402. In addition, the display interface 202 can depict a device location 416. The device location 416 is a geographic location or coordinate of a device connected to the navigation system 100 such as the first device 102.

The navigation system 100 can generate a geo-fence 414 around the interest location 406. The geo-fence 414 is a virtual perimeter surrounding a geographic area or location in the real world. The geometry of the geo-fence 414 can include a circle, an ellipsoid, a polygon, or a combination thereof. The size of the geo-fence 414 can be defined by a distance segment, such as a radius, stemming from a reference point, such as a center point.

The display interface 202 can also depict a navigation behavior 404. The navigation behavior 404 is navigation data concerning a location which is indicative of a characteristic of the location. The navigation behavior 404 can include a stoppage frequency 408, a total stoppage time 410, or a combination thereof. The stoppage frequency 408 is a number of times a device connected to the navigation system 100 stopped at a location. The total stoppage time 410 is a total amount of time one or more devices connected to the navigation system 100 stopped at a geographic location or coordinate.

As an example, the stoppage frequency 408 can be the number of times the first device 102 stopped at the interest location 406. As an additional example, the total stoppage time 410 can be the total number of minutes all devices connected to the navigation system 100 stopped at the interest location 406. As will be discussed in more detail below, the navigation system 100 can determine a device has stopped at the interest location 406 when the device is detected within the geo-fence 414 surrounding the interest location 406.

The navigation system 100 can determine the navigation behavior 404 over a confirmation period 412. The confirmation period 412 is a set period of time after the update 402 to the interest list 302. As an example, the confirmation period 412 can be a period of one week, one month, or three months after the update 402 to the interest list 302.

The display interface 202 can also depict a navigation threshold 418. The navigation threshold 418 are minimum or maximum limit values concerning the navigation behavior 404. As an example, the navigation threshold 418 for the stoppage frequency 408 of a new POI added to the interest list 302 can be a minimum of 100 stops within the confirmation period 412 of one week. As an additional example, the navigation threshold 418 for the total stoppage time 410 of a new POI added to the interest list 302 can be a minimum of 1000 minutes within the confirmation period 412 of one week.

Figure 5:
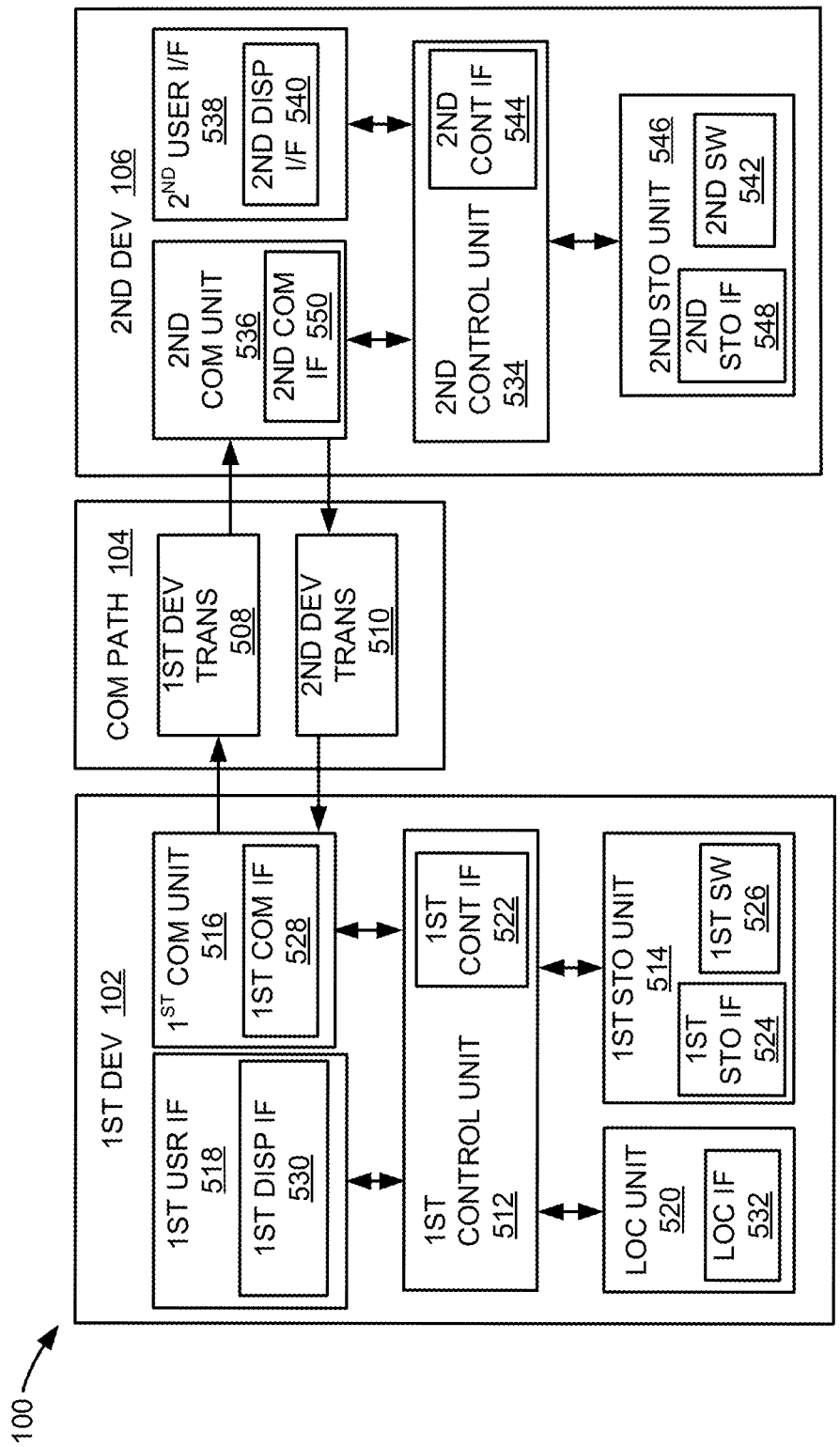
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first device 102 can be similarly described by the first device 102.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate a location or movement information, including a geographic position, a heading, an inertial orientation, a speed, an altitude, or a combination thereof or a change therein of the first device 1002. The location unit 520 can be implemented in many ways.

For example, the location unit 520 can function as at least a part of a global positioning system (GPS), a global navigation satellite system (GLONASS), an inertial navigation system, a cellular-tower location system, a pressure location system, or any combination thereof. The location unit 220 can include an accelerometer, a gyroscope, an airspeed indicator, a compass, a heading indicator, an altimeter, an automatic dependent surveillance-broadcast (ADS-B) transponder, or a combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, POIs, navigation routing entries, reviews/ratings, feedback, traffic patterns, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. The first display interface 552830 can include a display, a projector, a video screen, a speaker, or any combination thereof.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows the user to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, POIs, navigation routing entries, reviews/ratings, feedback, traffic patterns, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
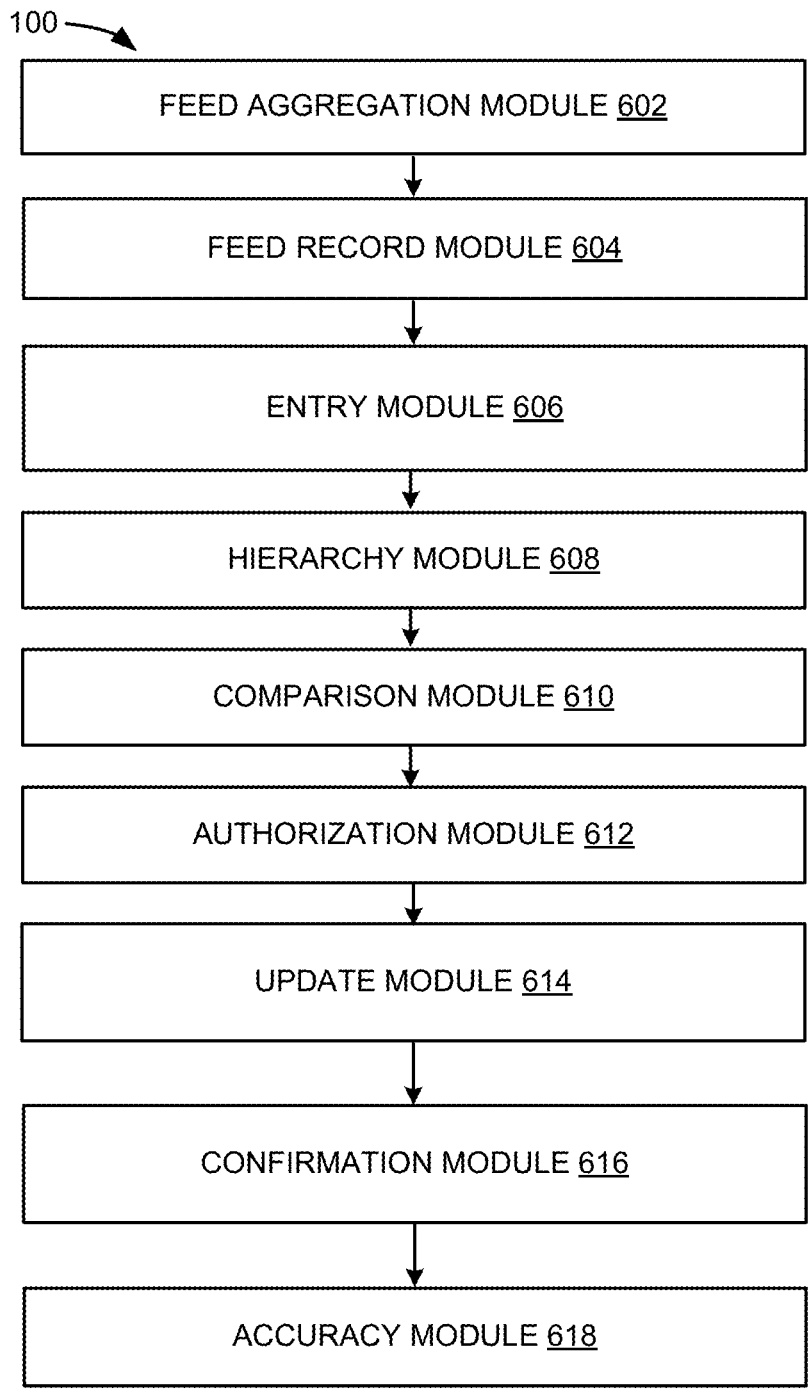
FIG. 6 is a control flow of the navigation system.

Referring now to FIG. 6, therein is shown a control flow of the navigation system 100 with a feed prioritization mechanism. The navigation system 100 can include a feed aggregation module 602, a feed record module 604, an entry module 606, a hierarchy module 608, a comparison module 610, an authorization module 612, an update module 614, a confirmation module 616, an accuracy module 618, or a combination thereof.

The modules can be coupled by having the input of one module connected to the output of another module as shown in FIG. 5. The modules can be coupled by using wired or wireless connections, the communication path 104 of FIG. 1, instructional steps, or a combination thereof. The modules can be coupled directly, without any intervening structures other than the structure providing the direct connection. The modules can further be coupled indirectly, through a shared connection or other functional structures between the coupled modules.

The feed aggregation module 602 is configured to aggregate one or more instances of the interest feed 204 of FIG. 2. The feed aggregation module 602 can aggregate instances of the interest feed 204 by retrieving or receiving information from a variety of sources.

The feed aggregation module 602 can aggregate one or more instances of the interest feed 204 by retrieving the interest feed 204 from a device in the navigation system 100, a device accessible to the navigation system 100, or a combination thereof. For example, the feed aggregation module 602 can retrieve one or more instances of the interest feed 204 by querying a POI database. As a more specific example, the feed aggregation module 602 can retrieve one or more instances of the interest feed 204 by downloading a POI dataset from OpenStreetMap™. As an additional example, the feed aggregation module 602 can retrieve one or more instances of the interest feed 204 by accessing the POI database through a third party application programming interface (API).

The feed aggregation module 602 can also aggregate one or more instances of the interest feed 204 by receiving one or more instances of the interest feed 204 from a device in the navigation system 100, a device accessible to the navigation system 100, or a combination thereof. For example, the feed aggregation module 602 can collect one or more instances of the interest feed 204 by receiving a comma-separated values (CSV) file containing POI data from a map vendor.

As an additional example, the feed aggregation module 602 can receive one or more instances of the interest feed 204 by subscribing to a web feed. As a more specific example, the feed aggregation module 602 can receive one or more instances of the interest feed 204 by subscribing to an extensible markup language (XML) feed such as a rich site summary (RSS) feed or an Atom feed.

The feed aggregation module 602 can store one or more instances of the interest feed 204 in the first storage unit 514 of FIG. 5, the second storage unit 546 of FIG. 5, or a combination thereof. The feed aggregation module 602 can also aggregate one or more instances of the interest feed 204 by accessing a stored instance of the interest feed 204 from the first storage unit 514 using the first storage interface 524 of FIG. 5, the second storage unit 546 using the second storage interface 548 of FIG. 5, or a combination thereof.

The feed aggregation module 602 can be part of the first software 526 of FIG. 5, the second software 542 of FIG. 5, or a combination thereof. The first control unit 512 of FIG. 5 can execute the first software 526, the second control unit 534 of FIG. 5 can execute the second software 542, or a combination thereof to aggregate one or more instances of the interest feed 204.

Moreover, the feed aggregation module 602 can also communicate one or more instances of the interest feed 204 between devices through the first communication unit 516 of FIG. 5, the second communication unit 536 of FIG. 5, or a combination thereof. After aggregating one or more instances of the interest feed 204, the control flow can pass from the feed aggregation module 602 to the feed record module 604.

The feed record module 604 is configured to generate the feed record 210 of FIG. 2. The feed record module 604 can generate the feed record 210 based on the feed name 212 of FIG. 2, the collection time 232 of FIG. 2, the feed characteristic 214 of FIG. 2, or a combination thereof.

The feed record module 604 can generate the feed record 210 by recording the collection time 232. The feed record module 604 can record the collection time 232 by applying a time stamp to the interest feed 204, the feed entries 236 of FIG. 2 from the interest feed 204, or combination thereof at the time the interest feed 204 was received or retrieved by the navigation system 100.

The feed record module 604 can also generate the feed record 210 by applying the feed identifier 238 of FIG. 2 to the feed entries 236 from the interest feed 204. The feed record module 604 can apply the feed identifier 238 to the feed entries 236 for associating the feed entries 236 with their originating feeds.

The feed record module 604 can generate the feed identifier 238 based on the feed name 212, the feed characteristic 214, the collection time 232, or a combination thereof. For example, the feed record module 604 can generate the feed identifier 238 by incorporating the feed name 212, or a portion therein, and the feed source 216 of FIG. 2 into the feed identifier 238. In addition, the feed record module 604 can generate the feed identifier 238 by incorporating the collection time 232 and the feed cost 224 of FIG. 2 into the feed identifier 238.

The feed record module 604 can apply the feed identifier 238 to the feed entries 236 in a number of ways. As an example, the feed record module 604 can apply the feed identifier 238 to the feed entries 236 by applying a tag to the feed entries 236 with the feed name 212, the feed characteristic 214, the collection time 232, or a combination thereof. As an additional example, the feed record module 604 can apply the feed identifier 238 to the feed entries 236 by adding metadata to the feed entries 236 using the feed name 212, the feed characteristic 214, the collection time 232, or a combination thereof. As a more specific example, the feed record module 604 can apply the feed identifier 238 of "sbux_TUF_loc_102014" to one of the feed entries 236 to indicate that the navigation system 100 received this particular entry from a Starbucks™ transaction update file (TUF) on Oct. 20, 2014.

The feed record module 604 can also generate the feed record 210 by including the feed frequency 234 of FIG. 2. The feed record module 604 can determine the feed frequency 234 by determining the number of times an instance of the interest feed 204 was received or retrieved by the feed aggregation module 602 over a period of time predetermined by the navigation system 100. As an example, the feed record module 604 can determine the feed frequency 234 based on past instances of the collection time 232 stored as part of the feed record 210.

The feed record module 604 can store the feed record 210 in the first storage unit 514, the second storage unit 546, or a combination thereof. The feed record module 604 can be part of the first software 526, the second software 542, or a combination thereof. The first control unit 512 can execute the first software 526, the second control unit 534 can execute the second software 542, or a combination thereof to generate the feed record 210.

Moreover, the feed record module 604 can also communicate the feed record 210 between devices through the first communication unit 516, the second communication unit 536, or a combination thereof. After generating the feed record 210, the control flow can pass from the feed record module 604 to the entry module 606.

The entry module 606 is configured to generate the entry identifier 240 of FIG. 2. The entry module 606 can generate the entry identifier 240 based on the entry category 242 of FIG. 2, the entry content 250 of FIG. 2, or a combination thereof of the feed entries 236 included as part of the interest feed 204.

The entry module 606 can generate the entry identifier 240 by classifying or labeling the feed entries 236 with the entry category 242, the entry content 250, or a combination thereof. For example, the entry module 606 can generate the entry identifier 240 by classifying or labeling the feed entries 236 as the location entry 244 of FIG. 2 or the event entry 246 of FIG. 2.

As a more specific example, the entry module 606 can generate the entry identifier 240 by applying tags of "Restaurant," "Business," "Travel Destination," or a combination thereof to one of the feed entries 236 labeled as the location entry 244. As an additional example, the entry module 606 can generate the entry identifier 240 by adding metadata to one of the feed entries 236 labeled as the event entry 246 indicating whether an event indicated in the entry is a recurring event, a one-time event, an outdoor event, an indoor event, or a combination thereof.

Moreover, the entry module 606 can generate the entry identifier 240 by classifying or labeling the feed entries 236 by the entry content 250. For example, the entry module 606 can indicate whether the data or information received from the feed entries 236 is a physical address, a website address, an hours of operation, a phone number, or a combination thereof. As a more specific example, the entry module 606 can generate the entry identifier 240 for one of the feed entries 236 as an "Address Entry" when this particular instance of the feed entries 236 contains location information or geographic coordinates.

In addition, the entry module 606 can include as part of the entry identifier 240 the timing 248 of FIG. 2 of the feed entries 236 when the feed entries 236 are instances of the event entry 246. For example, the entry module 606 can include as part of the entry identifier 240 an event date, an event time, or a combination thereof representing the timing 248 of the event entry 246.

The entry module 606 can store the entry identifier 240 as part of the feed record 210. In addition, the entry module 606 can store the entry identifier 240 in the first storage unit 514, the second storage unit 546, or a combination thereof. The entry module 606 can be part of the first software 526, the second software 542, or a combination thereof. The first control unit 512 can execute the first software 526, the second control unit 534 can execute the second software 542, or a combination thereof to generate the entry identifier 240.

Moreover, the entry module 606 can also communicate the entry identifier 240 between devices through the first communication unit 516, the second communication unit 536, or a combination thereof. After generating the entry identifier 240, the control flow can pass from the entry module 606 to the hierarchy module 608.

The hierarchy module 608 is configured to generate the feed hierarchy 252 of FIG. 2 for prioritizing the trustworthiness 254 of FIG. 2 of the interest feed 204. The hierarchy module 608 can generate the feed hierarchy 252 using the priority rules 258 of FIG. 2 generated based on the feed characteristic 214, the feed frequency 234, the entry content 250 of the feed entries 236, the entry category 242, the feed error rate 262 of FIG. 2, or a combination thereof. The hierarchy module 608 can determine the feed characteristic 214 and the feed frequency 234 by accessing the feed record 210 generated by the feed record module 604.

The hierarchy module 608 can generate the feed hierarchy 252 by using the priority rules 258 by taking into account the feed characteristic 214 such as the feed source 216, the feed cost 224, the feed type 230 of FIG. 2, or a combination thereof. As an example, the hierarchy module 608 can generate an instance of the priority rules 258 based on the feed source 216. As a more specific example, this instance of the priority rules 258 can automatically assign the highest instance of the hierarchy position 256 of FIG. 2 to the brand-specific feed 218 of FIG. 2, the next instance of the hierarchy position 256 to the general commercial feed 220 of FIG. 2, and the lowest instance of the hierarchy position 256 to the user-generated feed 222 of FIG. 2.

Also, for example, the hierarchy module 608 can generate the priority rules 258 by assigning the trust score 260 of FIG. 2 based on the feed characteristic 214. As a more specific example, an instance of the trust score 260 closer to 100 on a scale of 1 to 100 is considered the most trustworthy. As an even more specific example, one of the priority rules 258 can automatically assign the trust score 260 of "99" to the Starbucks™ store feed and the trust score 260 of "89" to the AT&T Interactive™ (ATTi™) paid feed. The navigation system 100 can prioritize the brand-specific feed 218 over the general commercial feed 220 and the user-generated feed 222 by putting greater weight on the trustworthiness 254 of brand-specific information originating from a brand source.

As an additional example, the hierarchy module 608 can also generate the priority rules 258 based on the feed source 216 and the feed cost 224. For example, the hierarchy module 608 can generate one instance of the priority rules 258 concerning the feed source 216 and another instance of the priority rules 258 concerning the feed cost 224.

As a more specific example, two instances of the interest feed 204 can come from the same instance of the feed source 216 such as from AT&T Interactive™ (ATTi)™. In this example, the first feed 206 of FIG. 2 can be the paid feed 226 of FIG. 2, such as the ATTi™ paid feed, and the second feed 208 can be the free feed 228 of FIG. 2, such as the ATTi™ free feed. The hierarchy module 608 can initially execute one instance of the priority rules 258 and place the first feed 206 and the second feed 208 on the same instance of the hierarchy position 256 based solely on the feed source 216. However, the hierarchy module 608 can then execute another instance of the priority rules 258 and place the first feed 206 and the second feed 208 on different levels of the hierarchy position 256 by taking into account the feed cost 224.

As yet another example, the hierarchy module 608 can generate the feed hierarchy 252 based on the feed source 216, the feed cost 224, and the feed type 230. For example, the hierarchy module 608 can generate additional instances of the priority rules 258 concerning the feed type 230. As a more specific example, the priority rules 258 can automatically assign a higher instance of the hierarchy position 256 to an RSS feed over a web crawl feed.

The hierarchy module 608 can also generate the feed hierarchy 252 based on the feed frequency 234, the entry content 250 of the feed entries 236, or a combination thereof. As an example, the hierarchy module 608 can generate the priority rules 258 based on the feed frequency 234 by assigning a higher value of the trust score 260 to the interest feed 204 with a higher occurrence of the feed frequency 234. As a mores specific example, the hierarchy module 608 can assign the trust score 260 of "90" to an instance of the interest feed 204 received weekly and the trust score 260 of "80" to an instance of the interest feed 204 received monthly.

As an additional example, the hierarchy module 608 can generate the feed hierarchy 252 based on a specificity of the entry content 250 of the feed entries 236. As a more specific example, the hierarchy module 608 can generate the priority rules 258 to automatically assign the interest feed 204 with more instances of the entry content 250 the hierarchy position 256 above the interest feed 204 with less instances of the entry content 250.

As an even more specific example, the first feed 206 can include instances of the feed entries 236 which provide a physical address, a website address, a phone number, and operating hours for a POI. In addition, the second feed 208 can include instances of the feed entries 236 which provide only the physical address for the POI. In this example, the hierarchy module 608 can assign the first feed 206 the hierarchy position 256 above the second feed 208.

The hierarchy module 608 can also generate the feed hierarchy 252 based on the entry category 242. In addition, the hierarchy module 608 can associate the feed entries 236 with their originating feeds using the feed identifier 238.

As an example, the hierarchy module 608 can generate multiple instances of the feed hierarchy 252 depending on the entry category 242 including the location entry 244, the event entry 246, or a combination thereof. As a more specific example, the hierarchy module 608 can generate multiple instances of the feed hierarchy 252 based on multiple instances of the priority rules 258.

As a more specific example, the hierarchy module 608 can generate an instance of the feed hierarchy 252 for the feed entries 236 identified as the location entry 244. As an even more specific example, the hierarchy module 608 can generate an instance of the feed hierarchy 252 for the feed entries 236 identified as restaurant-type POIs. Also, for example, the hierarchy module 608 can generate another instance of the feed hierarchy 252 for the feed entries 236 identified as sporting event announcements.

The hierarchy module 608 can use multiple instances of the priority rules 258 to generate the feed hierarchy 252 based on the entry category 242. As an example, the hierarchy module 608 can use one instance of the priority rules 258 to prioritize the trustworthiness 254 of the brand-specific feed 218 over the trustworthiness 254 of the user-generated feed 222 for the location entry 244 such as POI addresses. In this example, the hierarchy module 608 can also use another instance of the priority rules 258 to prioritize the trustworthiness 254 of the user-generated feed 222 over the trustworthiness 254 of the brand-specific feed 218 for the event entry 246 such as musical event listings.

The hierarchy module 608 an also generate the feed hierarchy 252 based on the feed error rate 262. The hierarchy module 608 can interact with the accuracy module 618 to determine the feed error rate 262. Determining the feed hierarchy 252 using the feed error rate 262 will be discussed in more detail below.

The hierarchy module 608 can generate the feed hierarchy 252 at the collection time 232. In addition, the hierarchy module 608 can also generate the feed hierarchy 252 at regular intervals such as weekly, monthly, or a combination thereof. Moreover, the hierarchy module 608 can generate the feed hierarchy 252 when instances of the interest feed 204 reach a minimum threshold. As an example, the hierarchy module 608 can generate the feed hierarchy 252 when 10 instances of the interest feed 204 have been aggregated by the feed aggregation module 602 since the last time the feed hierarchy 252 was generated by the hierarchy module 608. The hierarchy module 608 can implement the feed hierarchy 252 as a hierarchical array, an adjacency array, or a combination thereof.

The hierarchy module 608 can store the feed hierarchy 252 in the first storage unit 514, the second storage unit 546, or a combination thereof. The hierarchy module 608 can be part of the first software 526, the second software 542, or a combination thereof. The first control unit 512 can execute the first software 526, the second control unit 534 can execute the second software 542, or a combination thereof to generate the feed hierarchy 252.

Moreover, the hierarchy module 608 can also communicate the feed hierarchy 252 between devices through the first communication unit 516, the second communication unit 536, or a combination thereof. After generating the feed hierarchy 252, the control flow can pass from the hierarchy module 608 to the comparison module 610.

The comparison module 610 is configured to determine the discrepancy 306 of FIG. 2. The comparison module 610 can determine the discrepancy 306 by comparing the interest feed 204 with the interest list 302 of FIG. 3, the feed record 210, or a combination thereof. The comparison module 610 can also determine the discrepancy 306 by comparing multiple instances of the interest feed 204 such as by comparing the first feed 206 with the second feed 208.

The comparison module 610 can confirm the discrepancy 306 by comparing multiple instances of the interest feed 204. In addition, the comparison module 610 can confirm the discrepancy 306 by comparing the interest feed 204 with the feed record 210, the interest list 302, or a combination thereof.

The comparison module 610 can determine the discrepancy 306 as the new entry 276 of FIG. 2, the missing entry 278 of FIG. 2, or the former entry 280 of FIG. 2. The comparison module 610 can determine the discrepancy 306 by comparing the feed entries 236 from the interest feed 204 aggregated by the feed aggregation module 602 with the list entries 304 of FIG. 3 in the interest list 302, previous instances of the feed entries 236 stored in the feed record 210, or a combination thereof. As an example, the comparison module 610 can compare the entry identifier 240 of the feed entries 236 with the entry identifier 240 of the list entries 304. As mentioned earlier, the list entries 304 can be instances of the feed entries 236 which have previously been added to the interest list 302.

The comparison module 610 can determine the discrepancy 306 as the new entry 276 when a comparison determines one of the feed entries 236 is not included in the interest list 302. The comparison module 610 can determine the new entry 276 by first comparing the feed entries 236 from the interest feed 204 with the list entries 304 from the interest list 302. The comparison module 610 can then compare any of the feed entries 236 not found in the interest list 302 with previous instances of the feed entries 236 stored in the feed record 210. The comparison module 610 can determine the discrepancy 306 as the new entry 276 when the feed entries 236 not included as part of the list entries 304 in the interest list 302 are also not included in the feed record 210.

As an example, the feed aggregation module 602 can receive a Starbucks™ location feed with one of the feed entries 236 being a Starbucks™ location on $3^{rd}$ Street. In this example, the comparison module 610 can first compare the Starbucks™ location feed with the interest list 302 to determine if the Starbucks™ location on $3^{rd}$ Street is included in the list entries 304. The comparison module 610 can then search the feed record 210 to see if the Starbucks™ location on $3^{rd}$ Street is included in the feed record 210. The comparison module 610 can determine the Starbucks™ location on $3^{rd}$ Street as the new entry 276 when the Starbucks™ location on $3^{rd}$ Street is neither included in the interest list 302 nor included in the feed record 210.

The comparison module 610 can determine the discrepancy 306 as the missing entry 278 when the interest list 302 contains an instance of the list entries 304 not among the feed entries 236 of the interest feed 204 aggregated by the feed aggregation module 602. The comparison module 610 can determine the missing entry 278 by first comparing the feed entries 236 from the interest feed 204 with previous instances of the feed entries 236 stored in the feed record 210. As an example, the comparison module 610 can determine the missing entry 278 by comparing the feed entries 236 from a new instance of the interest feed 204 with the feed entries 236 from one or more previous instances of the interest feed 204 stored in the feed record 210. In this example, the comparison module 610 can determine the missing entry 278 when the previous instance of the interest feed 204 includes an instance of the feed entries 236 not included in the new instance of the interest feed 204.

As a more specific example, the comparison module 610 can determine the missing entry 278 by comparing the feed entries 236 from the latest instance of the ATTi™ paid feed aggregated by the feed aggregation module 602 with the feed entries 236 from previous instances of the ATTi™ paid feed stored as part of the feed record 210. In this example, the comparison module 610 can determine the missing entry 278 as a restaurant on Main Street when the restaurant on Main Street is included in previous instances of the ATTi™ paid feed stored in the feed record 210 but not included in the latest instance of the ATTi™ paid feed aggregated by the feed aggregation module 602.

The comparison module 610 can then confirm the missing entry 278 by searching for the missing entry 278 in the list entries 304 in the interest list 302. As an example, the comparison module 610 can search the list entries 304 for the missing entry 278 determined in the initial comparison between the interest feed 204 and the feed record 210. Continuing with the example above, the comparison can determine the restaurant on Main Street as the missing entry 278 when the restaurant on Main Street is included in the list entries 304 but not included in the current instance of the interest feed 204 aggregated by the feed aggregation module 602.

The comparison module 610 can determine the discrepancy 306 as the former entry 280 in a number of ways. As an example, the comparison module 610 can determine the discrepancy 306 as the former entry 280 when one of the feed entries 236 of the interest feed 204 is not included in the interest list 302 but is included in the feed record 210. The comparison module 610 can determine the former entry 280 by first comparing the feed entries 236 from the interest feed 204 with the list entries 304 in the interest list 302. The comparison module 610 can then compare any of the feed entries 236 not included as part of the list entries 304 with the feed record 210. The comparison module 610 can determine the discrepancy 306 as the former entry 280 when the feed entries 236 not included as part of the list entries 304 are found in the feed record 210.

As a more specific example, the comparison module 610 can determine the former entry 280 by comparing the feed entries 236 from the latest instance of the Citysearch™ POI feed with the list entries 304 from the interest list 302. Continuing with this example, the comparison module 610 can then compare any POIs not included as part of the list entries 304 with previous instances of the feed entries 236 in the feed record 210. In this example, the comparison module 610 can determine one of the POIs as the former entry 280 when the POI is not included in the interest list 302 but is included in the feed record 210 as one of the feed entries 236 in a previous instance of the interest feed 204.

As another example, the comparison module 610 can determine the discrepancy 306 as the former entry 280 when one of the feed entries 236 of the interest feed 204 is included in the purge queue 314 of FIG. 3. In this example, the comparison module 610 can determine the former entry 280 by searching the feed entries 236 for the list entries 304 stored in the purge queue 314. The purge queue 314 will be discussed in more detail below.

The comparison module 610 can store the discrepancy 306 including the new entry 276, the missing entry 278, the former entry 280, or a combination thereof in the first storage unit 514, the second storage unit 546, or a combination thereof. The comparison module 610 can be part of the first software 526, the second software 542, or a combination thereof. The first control unit 512 can execute the first software 526, the second control unit 534 can execute the second software 542, or a combination thereof to determine the discrepancy 306.

Moreover, the comparison module 610 can also communicate the discrepancy 306 between devices through the first communication unit 516, the second communication unit 536, or a combination thereof. After determining the discrepancy 306, the control flow can pass from the comparison module 610 to the authorization module 612.

The authorization module 612 is configured to determine the feed authorization 264 of FIG. 2. The authorization module 612 can determine the feed authorization 264 for authorizing the interest feed 204 to manipulate the interest list 302 of FIG. 3.

The feed authorization 264 can include the addition authority 270 of FIG. 2, the removal authority 272 of FIG. 2, the contribution authority 274 of FIG. 2, or a combination thereof. The addition authority 270 can permit or authorize other modules in the navigation system 100 to make additions to the interest list 302 on account of the information provided by the interest feed 204. As an example, the addition authority 270 permits the navigation system 100 to add the new entry 276, the former entry 280, or a combination thereof to the interest list 302 on account of the information provided by the interest feed 204.

The removal authority 272 can permit or authorize other modules in the navigation system 100 to remove one or more instances of the list entries 304 from the interest list 302 on account of the information provided by the interest feed 204. As an example, the addition authority 270 permits the navigation system 100 to remove the instance of the list entries 304 corresponding to the missing entry 278 from the interest list 302 on account of the information provided by the interest feed 204.

The authorization module 612 can determine the feed authorization 264 based on the feed characteristic 214, the feed hierarchy 252, the entry category 242, or a combination thereof. As an example, the authorization module 612 can determine the feed authorization 264 based on the feed characteristic 214 including the feed source 216, the feed cost 224, the feed type 230, or a combination thereof.

As a more specific example, the authorization module 612 can determine the feed authorization 264 of the brand-specific feed 218 to have the addition authority 270, the removal authority 272, and the contribution authority 274. Also, for example, the authorization module 612 can determine the general commercial feed 220 to have the addition authority 270 and the contribution authority 274 but not the removal authority 272. As another example, the authorization module 612 can determine the user-generated feed 222 to have the contribution authority 274 but not the addition authority 270 or the removal authority 272.

As another more specific example, the authorization module 612 can determine the feed authorization 264 of the paid feed 226 to have the addition authority 270, the removal authority 272, and the contribution authority 274. Also, for example, the authorization module 612 can determine the free feed 228 to have the addition authority 270 and the contribution authority 274 but not the removal authority 272.

As an additional example, the authorization module 612 can determine the feed authorization 264 based on the feed hierarchy 252. As a more specific example, the authorization module 612 can determine the feed authorization 264 based on the hierarchy position 256 of the interest feed 204 relative to other instances of the interest feed 204 aggregated by the feed aggregation module 602.

As an even more specific example, the authorization module 612 can determine the feed authorization 264 of the interest feed 204 with the highest instance of the hierarchy position 256 to have the addition authority 270, the removal authority 272, and the contribution authority 274. Also, for example, the authorization module 612 can determine the feed authorization 264 of the interest feed 204 with the highest instance of the trust score 260 to have the addition authority 270, the removal authority 272, and the contribution authority 274.

As an additional example, the authorization module 612 can determine the feed authorization 264 of the interest feed 204 with the lowest instance of the hierarchy position 256 or the lowest instance of the trust score 260 to have only the contribution authority 274.

As another example, the authorization module 612 can adjust the feed authorization 264 of the interest feed 204 based on the entry category 242 of the feed entries 236 included as part of the interest feed 204. As a more specific example, the authorization module 612 can adjust the feed authorization 264 of the interest feed 204 based on the entry category 242 of one or more of the feed entries 236 determined to be the discrepancy 306.

As an even more specific example, the interest feed 204 can be the user-generated feed 222, such as a customer review feed, and the discrepancy 306 can be the event entry 246, such as a concert event. In this example, the authorization module 612 can adjust the feed authorization 264 of the user-generated feed 222 to permit the customer review feed to have both the addition authority 270 and the contribution authority 274 based on the entry category 242.

Also, for example, the interest feed 204 can be the general commercial feed 220, such as the ATTi™ paid feed, and the discrepancy 306 can be the entry content 250 of a menu item for a restaurant. In this example, the authorization module 612 can adjust the feed authorization 264 of the ATTi™ paid feed to permit the ATTi™ paid feed to have the removal authority 272 along with the addition authority 270 and the contribution authority 274 based on the innocuous nature of the entry content 250.

The authorization module 612 can store the feed authorization 264 in the first storage unit 514, the second storage unit 546, or a combination thereof. The authorization module 612 can be part of the first software 526, the second software 542, or a combination thereof. The first control unit 512 can execute the first software 526, the second control unit 534 can execute the second software 542, or a combination thereof to determine the feed authorization 264.

Moreover, the authorization module 612 can also communicate the feed authorization 264 between devices through the first communication unit 516, the second communication unit 536, or a combination thereof. After determining the feed authorization 264, the control flow can pass from the authorization module 612 to the update module 614.

The update module 614 is configured to generate the update 402 of FIG. 4 to the interest list 302. The update module 614 can generate the update 402 based on the discrepancy 306, the feed hierarchy 252, and the feed authorization 264.

As an example, the update module 614 can generate the update 402 by adding the new entry 276 to the interest list 302. As an additional example, the update module 614 can generate the update 402 by purging one of the list entries 304 corresponding to the missing entry 278 from the interest list 302. As another example, the update module 614 can generate the update 402 by restoring one of the list entries 304 corresponding to the former entry 280 to the interest list 302.

The update module 614 will be discussed in greater detail below. The update module 614 can be part of the first software 526, the second software 542, or a combination thereof. The first control unit 512 can execute the first software 526, the second control unit 534 can execute the second software 542, or a combination thereof to generate the update 402 to the interest list 302.

Moreover, the update module 614 can also communicate the update 402 between devices through the first communication unit 516, the second communication unit 536, or a combination thereof. After generating the update 402, the control flow can pass from the update module 614 to the confirmation module 616.

The confirmation module 616 is configured to confirm the update 402 to the interest list 302 based on the navigation behavior 404 of FIG. 4 at the interest location 406 of FIG. 4 associated with the update 402. As an example, the update 402 can involve adding the new entry 276 to the interest list 302. In this example, the confirmation module 616 can confirm the new entry 276 by analyzing the navigation behavior 404 at the interest location 406 associated with the new entry 276.

The confirmation module 616 can confirm the update 402 by first determining the interest location 406 associated with the update 402. As an example, the confirmation module 616 can determine the interest location 406 by searching for an address or coordinate associated with the update 402 from a POI database. As another example, the confirmation module 616 can determine the interest location 406 by using an address included in the feed entries 236.

The confirmation module 616 can then confirm the update 402 by determining the navigation behavior 404 at the interest location 406. The navigation behavior 404 can include the stoppage frequency 408 of FIG. 4, the total stoppage time 410 of FIG. 4, or a combination thereof. The confirmation module 616 can determine the navigation behavior 404 at the interest location 406 within the confirmation period 412 of FIG. 4. The confirmation period 412 can be one week, one month, or three months. The confirmation module 616 can determine the navigation behavior 404 in a number of ways.

As an example, the confirmation module 616 can determine the navigation behavior 404 by generating the geo-fence 414 of FIG. 4 around the interest location 406. The confirmation module 616 can generate the geo-fence 414 around the interest location 406 for determining the stoppage frequency 408, the total stoppage time 410, or a combination thereof at the interest location 406 within the confirmation period 412.

The confirmation module 616 can determine the stoppage frequency 408 by tracking the device location 416 of FIG. 4 of one or more devices connected to the navigation system 100 within the confirmation period 412. As an example, the confirmation module 616 can track the device location 416 of the first device 102 within the confirmation period 412. The confirmation module 616 can use the location unit 520 of FIG. 5, the first communication unit 516, the second communication unit 536, or a combination thereof to track the device location 416 of the first device 102.

As a more specific example, the confirmation module 616 can track the device location 416 of the first device 102 by using a GPS component of the location unit 520 to determine the geographic coordinates of the first device 102 over the confirmation period 412. As another more specific example, the confirmation module 616 can use the first communication unit 516 to determine the device location 416 of the first device 102 through a multilateration (MLAT) technique, a triangulation technique, or a combination thereof.

The confirmation module 616 can determine the stoppage frequency 408 by recording the number of times a device connected to the navigation system 100 was detected within the geo-fence 414 surrounding the interest location 406. As an example, the confirmation module 616 can determine the stoppage frequency 408 associated with a newly opened restaurant as 200 times within the confirmation period 412 of one week. As an additional example, the confirmation module 616 can determine the stoppage frequency 408 associated with a newly closed clothing store as 20 times within the confirmation period 412 of one week.

The confirmation module 616 can also determine the total stoppage time 410 at the interest location 406. The confirmation module 616 can determine the total stoppage time 410 by initiating a timer when a device connected to the navigation system 100 is first detected within the geo-fence 414 surrounding the interest location 406. The confirmation module 616 can then stop the timer when the device connected to the navigation system 100 is detected outside of the geo-fence 414.

As an example, the confirmation module 616 can determine the total stoppage time 410 by initiating the timer when the first device 102 is detected within the geo-fence 414 and stopping the timer when the first device 102 leaves the geo-fence 414. The confirmation module 616 can determine the total stoppage time 410 over the confirmation period 412 by adding up all of the time spent by devices connected to the navigation system 100 within the geo-fence 414.

The confirmation module 616 can confirm the update 402 to the interest list 302 by comparing the navigation behavior 404 at the interest location 406 with the navigation threshold 418 of FIG. 4. The navigation threshold 418 can be predetermined by the navigation system 100 based on the update 402 and the entry category 242. The navigation threshold 418 can include threshold levels for the stoppage frequency 408, the total stoppage time 410, or a combination thereof for each of the new entry 276, the former entry 280, and the missing entry 278.

As an example, the navigation threshold 418 for the stoppage frequency 408 associated with the new entry 276 can be a minimum of 100 stops within a one week period. As an additional example, the navigation threshold 418 for the total stoppage time 410 associated with the missing entry 278 can be a maximum of 100 minutes within a one week period.

The confirmation module 616 can confirm the update 402 to the interest list 302 when the navigation behavior 404 at the interest location 406 meets or exceeds the navigation threshold 418 associated with the update 402. The confirmation module 616 can confirm the update 402 to the interest list 302 by applying a confirmation tag or label to the list entries 304 associated with the update 402.

The confirmation module 616 can be part of the first software 526, the second software 542, or a combination thereof. The first control unit 512 can execute the first software 526, the second control unit 534 can execute the second software 542, or a combination thereof to confirm the update 402 to the interest list 302.

Moreover, the confirmation module 616 can also communicate the navigation behavior 404 between devices through the first communication unit 516, the second communication unit 536, or a combination thereof. After confirming the update 402, the control flow can pass from the confirmation module 616 to the accuracy module 618.

The accuracy module 618 is configured to adjust the feed hierarchy 252, the feed authorization 264, or a combination thereof based on the feed error rate 262 of FIG. 2. The accuracy module 618 can determine the feed error rate 262 based on the feed record 210, the addition count 310 of FIG. 3, the addition queue 308 of FIG. 3, the removal count 316 of FIG. 3 the purge queue 314 of FIG. 3, the navigation behavior 404, or a combination thereof.

As an example, the accuracy module 618 can determine the feed error rate 262 based on erroneous instances of the new entry 276, the missing entry 278, the former entry 280, or a combination thereof included in the interest feed 204. As a more specific example, the accuracy module 618 can determine the new entry 276, the former entry 280, or a combination thereof as erroneous when the new entry 276, the former entry 280, or a combination thereof is eventually removed from the addition queue 308. As another specific example, the accuracy module 618 can determine the missing entry 278 as erroneous when the list entries 304 corresponding to the missing entry 278 are eventually removed from the purge queue 314.

The new entry 276 or the former entry 280 can be removed from the addition queue 308 when another instance of the interest feed 204 contradicts the discrepancy 306 determined in the interest feed 204. As an example, the first feed 206 can be the free feed 228 such as the ATTi™ free feed. In this example, the comparison module 610 can compare the first feed 206 with the interest list 302 to determine one of the feed entries 236 as the new entry 276. Also, in this example, the navigation system 100 can add the new entry 276 to either the interest list 302 or the addition queue 308 based on the feed authorization 264 and the feed hierarchy 252.

Continuing with the example above, the feed aggregation module 602 can receive the second feed 208 at a subsequent instance of the collection time 232. The second feed 208 can be another instance of the interest feed 204 or a subsequent instance of the first feed 206 such as the first feed 206 received at a later time. The second feed 208 can contradict the first feed 206 by not including the new entry 276. Moreover, other instances of the interest feed 204 can corroborate the second feed 208 by also not including the new entry 276 in the feed entries 236. Based on this example, the navigation system 100 can remove the new entry 276 from the interest list 302 or add the new entry 276 to the purge queue 314. In this example, the accuracy module 618 can determine the new entry 276 provided by the first feed 206 as erroneous.

As yet another specific example, the accuracy module 618 can determine the new entry 276, the missing entry 278, the former entry 280, or a combination thereof as erroneous by taking into account the navigation behavior 404. As an example, the accuracy module 618 can determine the new entry 276, the missing entry 278, the former entry 280, or a combination thereof as erroneous when the navigation behavior 404 at the interest location 406 associated with the new entry 276, the missing entry 278, the former entry 280, or a combination thereof does not meet or exceed the navigation threshold 418 for the particular instance of the update 402.

The accuracy module 618 can determine the feed error rate 262 as the number of times the interest feed 204 provided an erroneous instance of the discrepancy 306 out of the total number of times the interest feed 204 was aggregated by the feed aggregation module 602. The accuracy module 618 can determine the feed error rate 262 as a percentage, a ratio, or a combination thereof.

The accuracy module 618 can adjust the feed hierarchy 252 based on the feed error rate 262. As an example, the accuracy module 618 can decrease the hierarchy position 256 of the interest feed 204 when the feed error rate 262 of the interest feed 204 exceeds a maximum threshold predetermined by the navigation system 100. As an additional example, the accuracy module 618 can increase the hierarchy position 256 of the interest feed 204 when the feed error rate 262 of the interest feed 204 goes below a minimum threshold.

As a more specific example, the minimum threshold can be 10% and the accuracy module 618 can increase the hierarchy position 256 of the interest feed 204 when the feed error rate 262 of the interest feed 204 falls below 10%. As another more specific example, the maximum threshold can be 30% and the accuracy module 618 can decrease the hierarchy position 256 of the interest feed 204 when the feed error rate 262 exceeds 30%.

The accuracy module 618 can be part of the first software 526, the second software 542, or a combination thereof. The first control unit 512 can execute the first software 526, the second control unit 534 can execute the second software 542, or a combination thereof to adjust the feed hierarchy 252 based on the feed error rate 262.

Moreover, the accuracy module 618 can also communicate the feed error rate 262 and an adjusted instance of the feed hierarchy 252 between devices through the first communication unit 516, the second communication unit 536, or a combination thereof.

Figure 7:
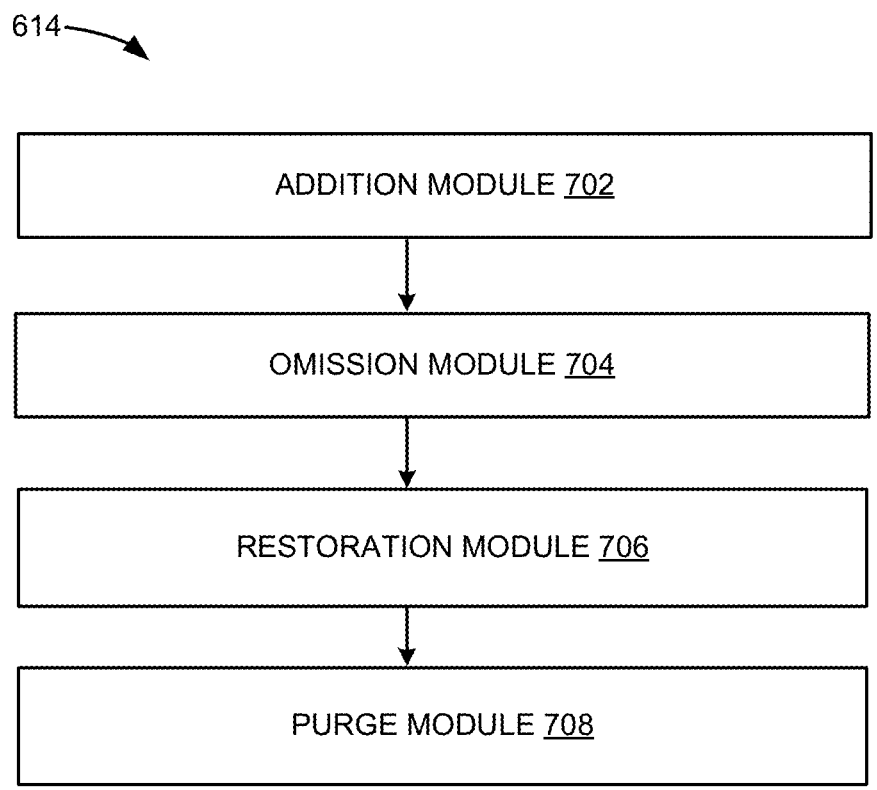
FIG. 7 is a detailed view of a portion of the control flow of the navigation system.

Referring now to FIG. 7, therein is shown a detailed view of a portion of the control flow of the navigation system 100. FIG. 7 is a detailed view of the update module 614 of FIG. 6. The update module 614 can include an addition module 702, an omission module 704, a restoration module 706, a purge module 708, or a combination thereof.

The addition module 702 is configured to generate the update 402 of FIG. 4 by adding the new entry 276 of FIG. 2 to the interest list 302 of FIG. 3. The addition module 702 can generate the update 402 by first associating the new entry 276 with the originating instance of the interest feed 204 of FIG. 2 using the feed identifier 238 of FIG. 2. The addition module 702 can then add the new entry 276 to the interest list 302 based on the feed hierarchy 252 of FIG. 2, the feed authorization 264 of FIG. 2, the addition count 310 of FIG. 3, or a combination thereof.

As an example, the addition module 702 can add the new entry 276 to the interest list 302 when the interest feed 204 has both the addition authority 270 of FIG. 2 and the highest instance of the hierarchy position 256 of FIG. 2 in the feed hierarchy 252. As a more specific example, the new entry 276 can be a new Starbucks™ café location and the interest feed 204 can be the Starbucks™ store location feed having the addition authority 270. In this example, the addition module 702 can add the new entry 276 to the interest list 302.

As an additional example, the addition module 702 can compare multiple instances of the interest feed 204 when one instance of the interest feed 204 includes the new entry 276 and another instance of the interest feed 204 does not include the new entry 276. As a more specific example, the addition module 702 can compare the first feed 206 of FIG. 2 with the second feed 208 of FIG. 2 when the first feed 206 includes the new entry 276 and the second feed 208 does not include the new entry 276.

In the example above, the addition module 702 can compare the first feed 206 with the second feed 208 when the first feed 206 and the second feed 208 share one or more instances of the feed characteristic 214 of FIG. 2. In other words, the addition module 702 can compare the first feed 206 with the second feed 208 when the discrepancy 306 of FIG. 3 would be shared by both the first feed 206 and the second feed 208 if the discrepancy 306 was not the result of an error.

As a more specific example, the first feed 206 can have the first authorization 266 of FIG. 2 and the second feed 208 can have the second authorization 268 of FIG. 2. In this example, the first authorization 266 can include the addition authority 270 and the second authorization 268 can also include the addition authority 270. Also, in this example, the first feed 206 can have a lower instance of the hierarchy position 256 than the second feed 208.

Continuing with this example, the new entry 276 can be included in the first feed 206 but not the second feed 208. Based on this example, the addition module 702 can add the new entry 276 to the addition queue 308 of FIG. 3 but not add the new entry 276 to the interest list 302. By only adding the new entry 276 to the addition queue 308 rather than the interest list 302, the addition module 702 can override the first feed 206 with the second feed 208 by putting greater weight on the trustworthiness 254 of FIG. 2 of the second feed 208. Also, in this example, the addition module 702 can increment the addition count 310 of FIG. 3 of the new entry 276 added to the addition queue 308. The addition queue 308 will be discussed in more detail below.

As another example, the first feed 206 can have a lower instance of the hierarchy position 256 than the second feed 208. In this example, the second authorization 268 can include the addition authority 270 but the first authorization 266 can only include the contribution authority 274 of FIG. 2. Also, in this example, the new entry 276 can be included in the first feed 206 but not the second feed 208. Based on this example, the addition module 702 can make note of the new entry 276 in the feed record 210 of FIG. 2 but cannot add the new entry 276 to the addition queue 308. By making note of the new entry 276 in the feed record 210 rather than adding the new entry 276 to the addition queue 308, the addition module 702 can override the first feed 206 with the second feed 208 based on the feed hierarchy 252.

The addition module 702 can add the feed entries 236 of FIG. 2 stored in the addition queue 308 to the interest list 302 when the addition count 310 of the feed entries 236 stored in the addition queue 308 exceeds the addition threshold 312 of FIG. 3. As an example, the addition threshold 312 can be three instances of the addition count 310 and the addition module 702 can add the new entry 276 in the addition queue 308 to the interest list 302 when the addition count 310 associated with the new entry 276 exceeds three instances of the addition count 310.

The addition module 702 can be part of the first software 526 of FIG. 5, the second software 542 of FIG. 5, or a combination thereof. The first control unit 512 of FIG. 5 can execute the first software 526, the second control unit 534 of FIG. 5 can execute the second software 542, or a combination thereof to add the new entry 276 to the interest list 302, increment the addition count 310, add the new entry 276 to the addition queue 308, or a combination thereof.

Moreover, the addition module 702 can also communicate the new entry 276, the addition count 310, the addition queue 308, or a combination thereof between devices through the first communication unit 516 of FIG. 5, the second communication unit 536 of FIG. 5, or a combination thereof. After adding the new entry 276 to the interest list 302, incrementing the addition count 310, adding the new entry 276 to the addition queue 308, or a combination thereof, the control flow can pass from the addition module 702 to the omission module 704.

The omission module 704 is configured to generate the update 402 by adding the list entries 304 of FIG. 3 corresponding to the missing entry 278 of FIG. 2 to the purge queue 314 of FIG. 3. The omission module 704 can generate the update 402 by first associating the missing entry 278 with the originating instance of the interest feed 204 using the feed identifier 238. The omission module 704 can then add the list entries 304 corresponding to the missing entry 278 based on the feed hierarchy 252, the feed authorization 264, the removal count 316 of FIG. 3, or a combination thereof.

As an example, the omission module 704 can add the list entries 304 corresponding to the missing entry 278 to the purge queue 314 when the interest feed 204 has both the removal authority 272 of FIG. 2 and the highest instance of the hierarchy position 256 in the feed hierarchy 252. As a more specific example, the missing entry 278 can be a restaurant POI which has ceased operations. In this example, the interest feed 204 can be the general commercial feed 220 of FIG. 2, such as the ATTi™ paid feed, having the removal authority 272. Based on this example, the omission module 704 can add the list entries 304 corresponding to the restaurant POI to the purge queue 314.

Also, in this example, the omission module 704 can increment the removal count 316 of FIG. 3 of the list entries 304 added to the purge queue 314. As an even more specific example, the omission module 704 can increment the removal count 316 of the list entries 304 corresponding to the missing entry 278 by two counts.

As an additional example, the omission module 704 can compare the first feed 206 and the second feed 208 when one of the feed entries 236 corresponding to the missing entry 278 is included in the second feed 208. The omission module 704 can compare the first feed 206 and the second feed 208 when the discrepancy 306 representing the missing entry 278 would be shared by both the first feed 206 and the second feed 208 if the discrepancy 306 was not the result of an error.

As a more specific example, the first authorization 266 of the first feed 206 can include the removal authority 272 and the second authorization 268 of the second feed 208 can include the removal authority 272. In this example, the first feed 206 can have a lower instance of the hierarchy position 256 than the second feed 208. Also, in this example, the missing entry 278 from the first feed 206 can be included in the second feed 208.

Based on this example, the omission module 704 can add the list entries 304 corresponding to the missing entry 278 to the purge queue 314 and increment the removal count 316 of the list entries 304 by one count. By incrementing the removal count 316 of the list entries 304 by only one count instead of two counts, the omission module 704 can override the first feed 206 with the second feed 208 by putting greater weight on the trustworthiness 254 of the second feed 208.

As another example, the first feed 206 can have a lower instance of the hierarchy position 256 than the second feed 208. In this example, the second authorization 268 can include the removal authority 272 but the first authorization 266 can only include the addition authority 270 or the contribution authority 274. Also, in this example, the missing entry 278 from the first feed 206 can be included in the second feed 208. Based on this example, the omission module 704 can make note of the missing entry 278 in the feed record 210 but cannot add the list entries 304 associated with the missing entry 278 to the purge queue 314. By making note of the missing entry 278 in the feed record 210 rather than adding it to the purge queue 314, the omission module 704 can override the first feed 206 with the second feed 208 based on the feed hierarchy 252.

The omission module 704 can be part of the first software 526, the second software 542, or a combination thereof. The first control unit 512 can execute the first software 526, the second control unit 534 can execute the second software 542, or a combination thereof to add the list entries 304 corresponding to the missing entry 278 to the purge queue 314.

Moreover, the omission module 704 can also communicate the missing entry 278, the purge queue 314, the removal count 316, or a combination thereof between devices through the first communication unit 516, the second communication unit 536, or a combination thereof. After adding the list entries 304 corresponding to the missing entry 278 to the purge queue 314, the control flow can pass from the omission module 704 to the restoration module 706.

The restoration module 706 is configured to restore the former entry 280 of FIG. 2. The restoration module 706 can restore the former entry 280 by adding the former entry 280 to the interest list 302 or by removing one instance of the removal count 316 from the list entries 304 stored in the purge queue 314.

The restoration module 706 can restore the former entry 280 by first associating the former entry 280 with the originating instance of the interest feed 204 using the feed identifier 238. The restoration module 706 can then restore the former entry 280 based on the feed hierarchy 252, the feed authorization 264, the removal count 316, or a combination thereof.

As an example, the restoration module 706 can restore the former entry 280 by adding the former entry 280 back to the interest list 302 when the former entry 280 does not correspond to any of the list entries 304 currently in the interest list 302. In this example, the restoration module 706 can add the former entry 280 back to the interest list 302 when the interest feed 204 has both the addition authority 270 and the highest instance of the hierarchy position 256 in the feed hierarchy 252.

As an additional example, when the former entry 280 corresponds to one of the list entries 304 in the purge queue 314, the restoration module 706 can restore the former entry 280 by removing one instance of the removal count 316 from the list entries 304. In this example, the restoration module 706 can remove the removal count 316 when the interest feed 204 has both the addition authority 270 and the highest instance of the hierarchy position 256.

The restoration module 706 can remove the removal count 316 by deleting the removal count 316 associated with the list entries 304 from the feed record 210, the interest list 302, or a combination thereof. Also, in this example, the restoration module 706 can remove the list entries 304 corresponding to the former entry 280 from the purge queue 314 when all instances of the removal count 316 associated with the list entries 304 are removed.

As another example, the restoration module 706 can compare multiple instances of the interest feed 204 when one instance of the interest feed 204, such as the first feed 206, includes the former entry 280 and another instance of the interest feed 204, such as the second feed 208, does not include the former entry 280.

As a more specific example, the first authorization 266 of the first feed 206 can include the addition authority 270 and the second authorization 268 of the second feed 208 can also include the addition authority 270. In this example, the first feed 206 can have a lower instance of the hierarchy position 256 than the second feed 208. Also, in this example, the former entry 280 can be included in the first feed 206 but not in the second feed 208. Based on this example, the restoration module 706 can add the former entry 280 to the addition queue 308 if the former entry 280 does not correspond to one of the list entries 304 currently in the interest list 302.

By adding the former entry 280 to the addition queue 308 rather than the interest list 302, the restoration module 706 can override the first feed 206 with the second feed 208 based on the feed hierarchy 252. Moreover, in this example, the restoration module 706 can increment the addition count 310 of the former entry 280. Also based on this example, when the former entry 280 corresponds to one of the list entries 304 in the purge queue 314, the restoration module 706 can restore the former entry 280 by removing one instance of the removal count 316 from the list entries 304 stored in the purge queue 314.

As another example, the first feed 206 can have a lower instance of the hierarchy position 256 than the second feed 208. In this example, the second authorization 268 can include the addition authority 270 but the first authorization 266 can only include the contribution authority 274. Also, in this example, the former entry 280 can be included in the first feed 206 but not the second feed 208. Based on this example, the restoration module 706 can make note of the former entry 280 in the feed record 210 but cannot add the former entry 280 back to the interest list 302 or remove the removal count 316 from the list entries 304 corresponding to the former entry 280 in the purge queue 314.

The restoration module 706 can add the feed entries 236 stored in the addition queue 308 back to the interest list 302 when the addition count 310 of the former entry 280 exceeds the addition threshold 312. As an example, the addition threshold 312 can be three instances of the addition count 310 and the restoration module 706 can add the former entry 280 in the addition queue 308 back to the interest list 302 when the addition count 310 of the former entry 280 exceeds three instances of the addition count 310.

The restoration module 706 can be part of the first software 526, the second software 542, or a combination thereof. The first control unit 512 can execute the first software 526, the second control unit 534 can execute the second software 542, or a combination thereof to restore the former entry 280.

Moreover, the restoration module 706 can also communicate the former entry 280, the removal count 316, the addition count 310, or a combination thereof between devices through the first communication unit 516, the second communication unit 536, or a combination thereof. After restoring the former entry 280, the control flow can pass from the restoration module 706 to the purge module 708.

The purge module 708 is configured to manage the addition queue 308, the purge queue 314, or a combination thereof. The purge module 708 can manage the addition queue 308 by removing the new entry 276 from the addition queue 308.

As an example, the purge module 708 can remove the new entry 276 from the addition queue 308 when the addition count 310 does not exceed the addition threshold 312 after a determination period. The determination period can be established by the navigation system 100 or a device coupled to the navigation system 100. As a more specific example, the purge module 708 can remove the new entry 276 from the addition queue 308 by deleting the addition count 310 associated with the new entry 276. As another more specific example, the purge module 708 can maintain the new entry 276 in the feed record 210 after removing the new entry 276 from the addition queue 308.

As an even more specific example, the addition threshold 312 can be three counts and the determination period can be one month. In this example, the purge module 708 can remove a POI entry from the addition queue 308 when the addition count 310 of the POI entry does not exceed three counts after one month. In this example, the purge module 708 can remove the new entry 276 since it is likely the new entry 276 was included by mistake by the interest feed 204. The purge module 708 can remove the new entry 276 from the addition queue 308 to prevent the new entry 276 from eventually being added to the interest list 302 by mistake.

The purge module 708 can manage the purge queue 314 by purging the list entries 304 stored in the purge queue 314. The purge module 708 can purge the list entries 304 stored in the purge queue 314 based on the removal count 316, the removal threshold 318 of FIG. 3, the entry category 242 of FIG. 2, or a combination thereof.

As an example, the purge module 708 can purge the list entries 304 stored in the purge queue 314 by deleting the list entries 304 from the interest list 302. In this example, the purge module 708 can still keep the list entries 304 in the feed record 210.

As an additional example, the purge module 708 can purge the list entries 304 based on the removal count 316 and the removal threshold 318. As a more specific example, the purge module 708 can set the removal threshold 318 at three counts. In this example, the purge module 708 can purge the list entries 304 from the purge queue 314 when the removal count 316 exceeds the removal threshold 318 of three counts.

As another example, the purge module 708 can adjust the removal threshold 318 based on the entry category 242. As an additional example, the purge module 708 can adjust the removal threshold 318 based on the entry category 242 and the entry content 250 of FIG. 2.

As an even more specific example, the purge module 708 can decrease the removal threshold 318 from three counts to one count based on the timing 248 of FIG. 2 of the event entry 246 of FIG. 2. In this example, the purge module 708 can decrease the removal threshold 318 when the timing 248 of the event entry 246 is imminent or approaching soon. As another more specific example, the purge module 708 can increase the removal threshold 318 for longstanding POI entries such as businesses or landmarks.

The purge module 708 can be part of the first software 526, the second software 542, or a combination thereof. The first control unit 512 can execute the first software 526, the second control unit 534 can execute the second software 542, or a combination thereof to manage the addition queue 308, the purge queue 314, or a combination thereof.

Moreover, the purge module 708 can also communicate the addition queue 308, the purge queue 314, or a combination thereof between devices through the first communication unit 516, the second communication unit 536, or a combination thereof.

The physical transformation of the update 402 to the interest list 302 results in movement in the physical world, such as people using the first device 102 of FIG. 1 to locate POIs or events using the navigation system 100. As the movement in the physical world occurs, the movement itself creates additional information that is converted back into adjustments to the feed hierarchy 252 that is displayable on the display interface 202 for the continued operation of the navigation system 100 and to continue movement in the physical world.

It has been discovered that determining the discrepancy 306 by comparing the interest feed 204 with another instance of the interest feed 204, the interest list 302, the feed record 210, or a combination thereof provides an additional mechanism for determining business or event openings or closures. As an example, the navigation system 100 can determine a business has closed or an event is canceled when the feed entries 236 associated with the closed business or canceled event is determined as the missing entry 278. As an additional example, the navigation system 100 can determine a new business has opened or a new event has been added when the feed entries 236 associated with the new business or event is determined as the new entry 276.

It has been discovered that determining the feed authorization 264 based on the feed hierarchy 252 improves the accuracy of a POI database such as the interest list 302. As an example, the feed hierarchy 252 reflects the trustworthiness 254 of multiple instances of the interest feed 204 and the navigation system 100 can put greater weight on the feed entries 236 provided by instances of the interest feed 204 at the top of the feed hierarchy 252.

It has been discovered that generating additional instances of the feed hierarchy 252 based on the feed characteristic 214 provides for an improved user experience. As an example, generating an additional instance of the feed hierarchy 252 for a musical event by assigning a higher instance of the hierarchy position 256 to the user-generated feed 222 of FIG. 2 than the general commercial feed 220 or the brand-specific feed 218 of FIG. 2 takes into account the value of user-generated information pertaining to social events or activities. As an additional example, assigning a lower instance of the hierarchy position 256 to the user-generated feed 222 than the general commercial feed 220 or the brand-specific feed 218 for POI information such as business address or telephone number balances the value of user-generated information and the tendency of users to make mistakes when contributing such information.

It has been discovered that generating the update 402 to the interest list 302 based on the discrepancy 306, the feed hierarchy 252, and the feed authorization 264 provides for an improved method of managing information from hundreds of instances of the interest feed 204 on a recurring basis. As an example, the navigation system 100 can receive or retrieve thousands of instances of the feed entries 236 at each instance of the collection time 232 of FIG. 2. The navigation system 100 would have a difficult time determining which updates to make to the interest list 302 without the systems and method described herein.

It has been discovered that adjusting the feed hierarchy 252 based on the feed error rate 262 improves the accuracy of the feed hierarchy 252. As an example, the interest feed 204 that provides more erroneous entries relative to other instances of the interest feed 204 will be assigned a lower instance of the hierarchy position 256 than other instances of the interest feed 204 which do not provide as many erroneous entries.

The modules describes in this application can be ordered or partitioned differently. For example, certain modules can be combined. Each of the modules can also operate individually and independently of the other modules. Further-more, data generated in one module can be used by another module without being directly coupled to each other.

The modules described in this application can be implemented by hardware circuitry or hardware acceleration units (not shown) in the control units. The modules described in this application can also be implemented by separate hardware units (not shown), including hardware circuitry, outside the control units but with the first device 102 or the second device 106.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices.

The modules described in this application can be implemented as instructions stored on a non-transitory computer readable medium to be executed by a first control unit 512, the second control unit 534, or a combination thereof. The non-transitory computer medium can include the first storage unit 514, the second storage unit 546, or a combination thereof. The first storage unit 514, the second storage unit 546, or a combination thereof, or a portion therein can also be made removable from the first device 102, the second device 106, or a combination thereof.

The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

Figure 8:
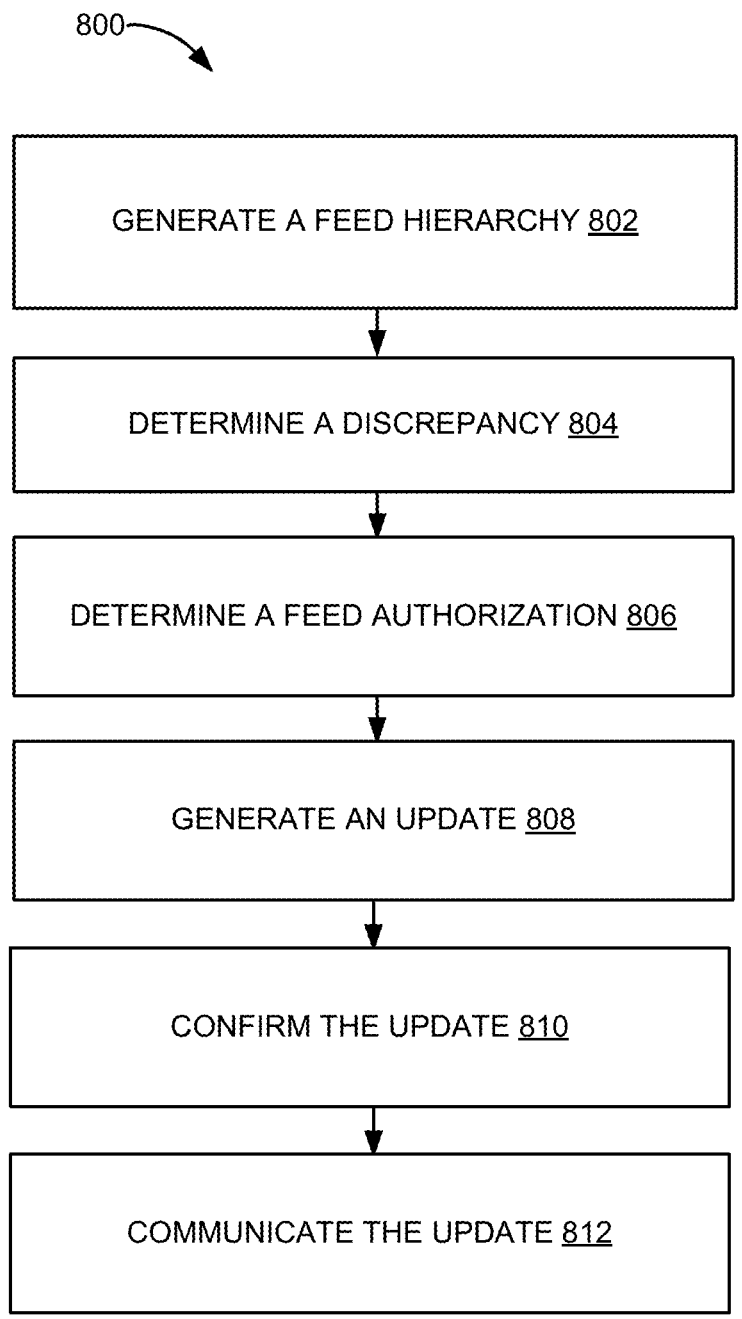
FIG. 8 is a flow chart of a method of operation of the navigation system in a further embodiment of the present invention.

Referring now to FIG. 8, therein is shown a flow chart of a method 800 of operation of the navigation system 100 of FIG. 1 in a further embodiment of the present invention. The method 800 includes: generating, with the control unit 512 of FIG. 5, the feed hierarchy 252 of FIG. 2 for prioritizing the trustworthiness 254 of FIG. 2 of the interest feed 204 of FIG. 2 based on the feed characteristic 214 of FIG. 2 in a block 802; determining the discrepancy 306 of FIG. 2 by comparing the interest feed 204 with the interest list 302 of FIG. 3, the feed record 210 of FIG. 2, or a combination thereof in a block 804; determining the feed authorization 264 of FIG. 2 based on the feed characteristic 214, the feed hierarchy 252, the entry category 242 of FIG. 2, or a combination thereof for manipulating the interest list 302 in a block 806; generating the update 402 of FIG. 4 to the interest list 302 based on the discrepancy 306, the feed hierarchy 252, and the feed authorization 264 in a block 808; confirming the update 402 to the interest list 302 based on the navigation behavior 404 of FIG. 4 at the interest location 406 associated with the update 402 in a block 810; and communicating the update 402 in a block 812.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
a control unit configured to:
generate a feed hierarchy for prioritizing a trustworthiness of an interest feed based on a feed characteristic;
determine a discrepancy by comparing the interest feed with an interest list, a feed record, or a combination thereof;
determine a feed authorization based on the feed characteristic, the feed hierarchy, an entry category, or a combination thereof for manipulating the interest list;
generate an update to the interest list based on the discrepancy, the feed hierarchy, and the feed authorization;
confirm the update to the interest list based on a navigation behavior at an interest location associated with the update as determined by a location unit coupled to the control unit; and
a communication interface, coupled to the control unit, and configured to communicate the update.

2. The system as claimed in claim 1 wherein the control unit is further configured to:
compare a first feed with the feed record, the interest list, or a combination thereof for identifying a new entry;
compare a second feed with the interest list, the first feed, or a combination thereof for confirming the new entry;
determine a first authorization of the first feed for adding the new entry to the interest list;
determine a second authorization of the second feed for overriding the first feed; and
generate the update to the interest list based on the new entry, the first authorization, and the second authorization.

3. The system as claimed in claim 1 wherein the control unit is further configured to:
compare a first feed with the feed record, the interest list, or a combination thereof for identifying a missing entry;
compare a second feed with the feed record, the interest list, the first feed, or a combination thereof for confirming the missing entry;
determine a first authorization of the first feed for removing one or more list entries from the interest list based on the missing entry;
determine a second authorization of the second feed for overriding the first feed; and
generate the update to the interest list based on the missing entry, the first authorization, and the second authorization.

4. The system as claimed in claim 1 wherein the control unit is further configured to:
compare a first feed with the feed record, the interest list, or a combination thereof for identifying a former entry;
compare a second feed with the interest list, the first feed, the feed record, or a combination thereof for confirming the former entry;
determine a first authorization of the first feed for restoring the former entry;
determine a second authorization of the second feed for overriding the first feed; and
generate the update to the interest list based on the former entry, the first authorization, and the second authorization.

5. The system as claimed in claim 1 wherein the control unit is further configured to adjust the feed hierarchy based on a feed error rate.

6. The system as claimed in claim 1 wherein the control unit is further configured to generate the feed hierarchy based on a feed source and a feed cost.

7. The system as claimed in claim 1 wherein the control unit is further configured to generate the feed hierarchy based on priority rules for prioritizing multiple instances of the interest feed.

8. The system as claimed in claim 1 wherein the control unit is further configured to restore a former entry by removing one or more list entries corresponding to the former entry from a purge queue.

9. The system as claimed in claim 1 wherein the control unit is further configured to add one or more list entries corresponding to a missing entry to a purge queue.

10. The system as claimed in claim 1 wherein the control unit is further configured to purge one or more list entries from the interest list based on the entry category of the list entries.

11. A method of operation of a navigation system comprising:
generating, with a control unit, a feed hierarchy for prioritizing a trustworthiness of an interest feed based on a feed characteristic;
determining a discrepancy by comparing the interest feed with an interest list, a feed record, or a combination thereof;
determining a feed authorization based on the feed characteristic, the feed hierarchy, an entry category, or a combination thereof for manipulating the interest list;
generating an update to the interest list based on the discrepancy, the feed hierarchy, and the feed authorization;
confirming the update to the interest list based on a navigation behavior at an interest location associated with the update as determined by a location unit coupled to the control unit; and
communicating the update.

12. The method as claimed in claim 11 further comprising:
comparing a first feed with the feed record, the interest list, or a combination thereof for identifying a new entry;
comparing a second feed with the interest list, the first feed, or a combination thereof for confirming the new entry;
determining a first authorization of the first feed for adding the new entry to the interest list;
determining a second authorization of the second feed for overriding the first feed; and
generating the update to the interest list based on the new entry, the first authorization, and the second authorization.

13. The method as claimed in claim 11 further comprising:
comparing a first feed with the feed record, the interest list, or a combination thereof for identifying a missing entry;
comparing a second feed with the interest list, the first feed, or a combination thereof for confirming the missing entry;
determining a first authorization of the first feed for removing one or more list entries from the interest list based on the missing entry;
determining a second authorization of the second feed for overriding the first feed; and
generating the update to the interest list based on the missing entry, the first authorization, and the second authorization.

14. The method as claimed in claim 11 further comprising:
comparing a first feed with the feed record, the interest list, or a combination thereof for identifying a former entry;
comparing a second feed with the interest list, the first feed, the feed record, or a combination thereof for confirming the former entry;
determining a first authorization of the first feed for restoring the former entry;
determining a second authorization of the second feed for overriding the first feed; and
generating the update to the interest list based on the former entry, the first authorization, and the second authorization.

15. The method as claimed in claim 11 further comprising adjusting the feed hierarchy based on a feed error rate.

16. A non-transitory computer readable medium, including instructions for execution, comprising:
generating a feed hierarchy for prioritizing a trustworthiness of an interest feed based on a feed characteristic;
determining a discrepancy by comparing the interest feed with an interest list, a feed record, or a combination thereof;
determining a feed authorization based on the feed characteristic, the feed hierarchy, an entry category, or a combination thereof for manipulating the interest list;
generating an update to the interest list based on the discrepancy, the feed hierarchy, and the feed authorization;
confirming the update to the interest list based on a navigation behavior at an interest location associated with the update; and
communicating the update.

17. The non-transitory computer readable medium as claimed in claim 16 further comprising:
comparing a first feed with the feed record, the interest list, or a combination thereof for identifying a new entry;
comparing a second feed with the interest list, the first feed, or a combination thereof for confirming the new entry;
determining a first authorization of the first feed for adding the new entry to the interest list;
determining a second authorization of the second feed for overriding the first feed; and generating the update to the interest list based on the new entry, the first authorization, and the second authorization.

18. The non-transitory computer readable medium as claimed in claim 16 further comprising:
    comparing a first feed with the feed record, the interest list, or a combination thereof for identifying a missing entry;
    comparing a second feed with the feed record, the interest list, the first feed, or a combination thereof for confirming the missing entry;
    determining a first authorization of the first feed for removing one or more list entries from the interest list based on the missing entry;
    determining a second authorization of the second feed for overriding the first feed; and
    generating the update to the interest list based on the missing entry, the first authorization, and the second authorization.

19. The non-transitory computer readable medium as claimed in claim 16 further comprising:
    comparing a first feed with the feed record, the interest list, or a combination thereof for identifying a former entry;
    comparing a second feed with the interest list, the first feed, the feed record, or a combination thereof for confirming the former entry;
    determining a first authorization of the first feed for restoring the former entry;
    determining a second authorization of the second feed for overriding the first feed; and
    generating the update to the interest list based on the former entry, the first authorization, and the second authorization.

20. The non-transitory computer readable medium as claimed in claim 16 further comprising adjusting the feed hierarchy based on a feed error rate.

* * * * *